United States Patent
Anderson et al.

(10) Patent No.: US 9,246,840 B2
(45) Date of Patent: Jan. 26, 2016

(54) DYNAMICALLY MOVE HETEROGENEOUS CLOUD RESOURCES BASED ON WORKLOAD ANALYSIS

(71) Applicant: International Business Machines Corporation, Armonk, NY (US)

(72) Inventors: Jason L. Anderson, San Jose, CA (US); Nimesh Bhatia, San Jose, CA (US); Gregory J. Boss, Saginaw, MI (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/106,547

(22) Filed: Dec. 13, 2013

(65) Prior Publication Data

US 2015/0172205 A1     Jun. 18, 2015

(51) Int. Cl.
*H04L 12/911* (2013.01)
(52) U.S. Cl.
CPC ...................................... *H04L 47/70* (2013.01)
(58) Field of Classification Search
CPC ..... G06F 9/505; G06F 9/5083; G06F 9/4856; G06F 9/45558; G06F 2009/4557; G06F 17/30575; G06F 11/30; G06F 11/3495; G06F 11/3452; G06F 11/3442; G06F 11/3414; G06F 21/00; H04L 43/08; H04L 43/50; H04L 43/10; H04L 47/70
See application file for complete search history.

(56) References Cited

U.S. PATENT DOCUMENTS

| | | | |
|---|---|---|---|
| 7,243,259 B2 | 7/2007 | Kim | |
| 7,461,223 B2 | 12/2008 | Anand et al. | |
| 7,660,897 B2 | 2/2010 | Hall, Jr. et al. | |
| 7,756,803 B2 | 7/2010 | Narayan et al. | |
| 7,757,214 B1 * | 7/2010 | Palczak et al. | ................ 717/121 |

(Continued)

FOREIGN PATENT DOCUMENTS

| | | |
|---|---|---|
| WO | WO2010042729 A2 | 4/2010 |
| WO | WO2011067099 A2 | 6/2011 |
| WO | 2013/0138979 | 9/2013 |

OTHER PUBLICATIONS

Buyya et al, "InterCloud: Utility-Oriented Federation of Cloud Computing Environments for Scaling of Application Services," Algorithms and Architectures for Parallel Processing, vol. 6081, pp. 13-31, 2010.

(Continued)

*Primary Examiner* — Vivek Srivastava
*Assistant Examiner* — Todd L Barker
(74) *Attorney, Agent, or Firm* — VanLeeuwen & VanLeeuwen; Joseph Petrokaitis

(57) ABSTRACT

An approach is provided for an information handling system to scale a workload being executed in a cloud computing environment. In the approach, performance of the workload is analyzed by using more than one resource configuration. The resource configurations use different resources that are available in the cloud computing environment. The analysis of the workload results in test results. At least one of the resource configurations is directed to a scaling up of resources that alters resources assigned to a first virtual machine (VM) running the workload. Another resource configuration is directed to a scaling out of resources that adds one or more VMs to a second VM creating a number of VMs running the workload. The test results are compared and an optimal test result is selected. A workload scaling profile is optimized according to the selected optimal test result.

15 Claims, 21 Drawing Sheets

(56) References Cited

U.S. PATENT DOCUMENTS

| | | | |
|---|---|---|---|
| 7,827,283 | B2 | 11/2010 | Naik et al. |
| 8,260,923 | B2 | 9/2012 | Shinohe et al. |
| 8,286,165 | B2 | 10/2012 | Miyata et al. |
| 8,332,517 | B2 | 12/2012 | Russell |
| 8,365,172 | B2 | 1/2013 | Fontenot et al. |
| 8,555,287 | B2* | 10/2013 | Ding et al. .................... 718/104 |
| 8,650,299 | B1 | 2/2014 | Huang et al. |
| 8,751,450 | B1* | 6/2014 | Gaonkar ............ G06F 17/30575 707/634 |
| 8,776,050 | B2* | 7/2014 | Plouffe et al. ..................... 718/1 |
| 8,839,222 | B1 | 9/2014 | Brandwine et al. |
| 2006/0140119 | A1* | 6/2006 | Yeh ........................ H04L 49/254 370/235 |
| 2008/0028409 | A1* | 1/2008 | Cherkasova et al. .......... 718/104 |
| 2008/0082983 | A1 | 4/2008 | Groetzner et al. |
| 2008/0295096 | A1* | 11/2008 | Beaty et al. ........................ 718/1 |
| 2009/0106323 | A1 | 4/2009 | Wong et al. |
| 2010/0077449 | A1 | 3/2010 | Kwok et al. |
| 2010/0115095 | A1 | 5/2010 | Zhu et al. |
| 2010/0125845 | A1* | 5/2010 | Sugumar et al. ................... 718/1 |
| 2010/0262857 | A1 | 10/2010 | Enarson et al. |
| 2011/0016473 | A1 | 1/2011 | Srinivasan |
| 2011/0066796 | A1 | 3/2011 | Eilert et al. |
| 2011/0099403 | A1 | 4/2011 | Miyata et al. |
| 2011/0119312 | A1 | 5/2011 | Chopra et al. |
| 2011/0154327 | A1 | 6/2011 | Kozat et al. |
| 2011/0191477 | A1 | 8/2011 | Zhang et al. |
| 2011/0238458 | A1 | 9/2011 | Purcell et al. |
| 2011/0246448 | A1 | 10/2011 | Tatemura et al. |
| 2011/0276649 | A1 | 11/2011 | Pujol et al. |
| 2011/0282834 | A1 | 11/2011 | Desai et al. |
| 2011/0314447 | A1 | 12/2011 | Malyshev et al. |
| 2012/0005264 | A1 | 1/2012 | McWhirter et al. |
| 2012/0084355 | A1 | 4/2012 | Locker et al. |
| 2012/0096470 | A1 | 4/2012 | Bartfai-Walcott et al. |
| 2012/0102189 | A1 | 4/2012 | Burge et al. |
| 2012/0226796 | A1 | 9/2012 | Morgan |
| 2012/0233625 | A1 | 9/2012 | Sabin et al. |
| 2012/0239883 | A1 | 9/2012 | Jain et al. |
| 2012/0240110 | A1 | 9/2012 | Breitgand et al. |
| 2012/0240115 | A1 | 9/2012 | Lefurgy et al. |
| 2012/0254443 | A1* | 10/2012 | Ueda ............................ 709/226 |
| 2012/0254862 | A1 | 10/2012 | Dong |
| 2012/0272234 | A1 | 10/2012 | Kaiser et al. |
| 2012/0303999 | A1 | 11/2012 | Calder et al. |
| 2012/0311012 | A1 | 12/2012 | Mazhar et al. |
| 2012/0324114 | A1 | 12/2012 | Dutta et al. |
| 2013/0007753 | A1 | 1/2013 | Jain |
| 2013/0055250 | A1 | 2/2013 | Pechanec et al. |
| 2013/0055265 | A1* | 2/2013 | Brown et al. ................. 718/100 |
| 2013/0055283 | A1* | 2/2013 | Mopur et al. ................. 718/104 |
| 2013/0061220 | A1* | 3/2013 | Gnanasambandam et al. ... 718/1 |
| 2013/0073894 | A1 | 3/2013 | Xavier et al. |
| 2013/0080619 | A1 | 3/2013 | Assuncao et al. |
| 2013/0081047 | A1 | 3/2013 | Frey et al. |
| 2013/0091241 | A1 | 4/2013 | Goetz et al. |
| 2013/0097304 | A1 | 4/2013 | Asthana et al. |
| 2013/0097601 | A1 | 4/2013 | Podvratnik et al. |
| 2013/0145206 | A1 | 6/2013 | Blinick et al. |
| 2013/0174146 | A1 | 7/2013 | Dasgupta et al. |
| 2013/0185729 | A1* | 7/2013 | Vasic ..................... G06F 9/5072 718/104 |
| 2013/0227566 | A1* | 8/2013 | Higuchi .............. G06F 9/45533 718/1 |
| 2013/0239115 | A1 | 9/2013 | Kato |
| 2014/0003249 | A1* | 1/2014 | Cai .......................... H04L 43/10 370/241 |
| 2014/0044004 | A1* | 2/2014 | Oda .................... H04L 41/5067 370/253 |
| 2014/0098822 | A1* | 4/2014 | Galles .................. H04L 49/208 370/412 |
| 2014/0153435 | A1* | 6/2014 | Rolette ............... H04L 63/0245 370/252 |
| 2014/0351412 | A1 | 11/2014 | Elisha |
| 2015/0058486 | A1* | 2/2015 | Huang .................... H04L 47/70 709/226 |
| 2015/0124622 | A1* | 5/2015 | Kovvali ............ H04W 28/0215 370/236 |

OTHER PUBLICATIONS

Chen et al., "Reliable migration module in trusted cloud based on security level—design and implementation," 2012 IEEE 26th International Parallel and Distributed Processing Symposium Workshops & PhD Forum, May 2012, Shanghai, China, pp. 2230-2236.

Chen et al., "Resource management framework for collaborative computing systems over multiple virtual machines," published online Sep. 16, 2011, Journal of Service Oriented Computing and Applications, vol. 5 Issue 4, Dec. 2011, pp. 225-243.

Zhang et al., "Distributed workload and response time management for web applications," 2011 7th International Conference on Network and Service Management (CNSM), Oct. 2011, Paris, France, 9 pages.

Zhan et al., "PhoenixCloud: Provisioning Resources for Heterogeneous Cloud Workloads," IEEE Transactions on Service Computing, Mar. 2010, 15 pages.

Lee et al., "Heterogeneity-Aware Resource Allocation and Scheduling in the Cloud," HotCloud'11 Proceedings of the 3rd USENIX conference on Hot topics in cloud computing, Portland, OR, Jun. 2011, 5 pages.

Deelman et al., "Grids and Clouds: Making Workflow Applications Work in Heterogeneous Distributed Environments," International Journal of High Performance Computing Applications OnlineFirst, published on Dec. 4, 2009 as doi:10.1177/1094342009356432, 15 pages.

Chen et al., "A Resource Management Methodology for Collaborative Computing System over Multiple Virtual Machines," Journal of Software, vol. 6, No. 11, Nov. 2011, pp. 2282-2291.

Malkowski et al., "Automated Control for Elastic n-Tier Workloads based on Empirical Modeling," The 8th IEEE/ACM International Conference on Autonomic Computing, Jun. 2011, Karlsruhe, Germany, 10 pages.

Lim et al., "Automated Control in Cloud Computing: Challenges and Opportunities," First Workshop on Automated Control for Datacenters and Clouds (ACDC09), Jun. 2009, Barcelona, Spain, 6 pages.

"Real-Time Agility Made Possible by Latest Teradata Technology," PR Newswire, Oct. 22, 2012, 6 pages.

"Tier 3 Unveils New Cloud Server Group Management Features," PR Newswire, Aug. 28, 2012, 4 pages.

Office Action for U.S. Appl. No. 14/106,510 (Anderson et al., "Dynamically Change Cloud Environment Configurations Based on Moving Workloads," filed Dec. 13, 2013), U.S. Patent and Trademark Office, mailed Dec. 22, 2013, 31 pages.

Final Office Action for U.S. Appl. No. 14/106,510 (Anderson et al., "Dynamically Change Cloud Environment Configurations Based on Moving Workloads," filed Dec. 13, 2013), U.S. Patent and Trademark Office, mailed Jun. 30, 2015, 29 pages.

Office Action for U.S. Appl. No. 14/106,510 (Anderson et al., "Dynamically Change Cloud Environment Configurations Based on Moving Workloads," filed Dec. 13, 2013), U.S. Patent and Trademark Office, mailed Nov. 9, 2015, 39 pages.

Office Action for U.S. Appl. No. 14/106,585 (Anderson et al., "Fractional Reserve High Availability Using Cloud Command Interception," filed Dec. 13, 2013), U.S. Patent and Trademark Office, mailed Nov. 6, 2015, 32 pages.

Office Action for U.S. Appl. No. 14/106,608 (Anderson et al., "Determining Horizontal Scaling Pattern for a Workload," filed Dec. 13, 2013), U.S. Patent and Trademark Office, mailed Nov. 6, 2015, 38 pages.

* cited by examiner

FIG. 3  (before dynamic reconfiguration)

FIG. 4  (after dynamic reconfiguration)

DYNAMICALLY MOVE HETEROGENEOUS CLOUD RESOURCES BASED ON WORKLOAD ANALYSIS

BACKGROUND OF THE INVENTION

Cloud computing relates to concepts that utilize large numbers of computers connected through a computer network, such as the Internet. Cloud based computing refers to network-based services. These services appear to be provided by server hardware. However, the services are instead served by virtual hardware (virtual machines, or "VMs"), that are simulated by software running on one or more real computer systems. Because virtual servers do not physically exist, they can therefore be moved around and scaled "up" or "out" on the fly without affecting the end user. Scaling "up" (or "down") refers to the addition (or reduction) of resources (CPU, memory, etc.) to the VM performing the work. Scaling "out" (or "in") refers to adding, or subtracting, the number of VMs assigned to perform a particular workload.

Workloads are usually scaled in a consistent manner based on a particular characteristic or on a set of characteristics. A set of resources are reserved for scaling. In a typical enterprise, a decision is made to either scale up or scale out. With the advent of cloud computing, enterprise now have the options to choose the scaling strategies based of the individual application component needs. Application workloads include different components. For example, a typical multi-tier application has one or more application (app) servers, databases, queuing services, caching services, identity management services, etc. These components have different resource needs in order to perform optimally.

SUMMARY

An approach is provided for an information handling system to scale a workload being executed in a cloud computing environment. In the approach, performance of the workload is analyzed by using more than one resource configuration. The resource configurations use different resources that are available in the cloud computing environment. The analysis of the workload results in test results. At least one of the resource configurations is directed to a scaling up of resources that alters resources assigned to a first virtual machine (VM) running the workload. Another resource configuration is directed to a scaling out of resources that adds one or more VMs to a second VM creating a number of VMs running the workload. The test results are compared and an optimal test result is selected. A workload scaling profile is optimized according to the selected optimal test result.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
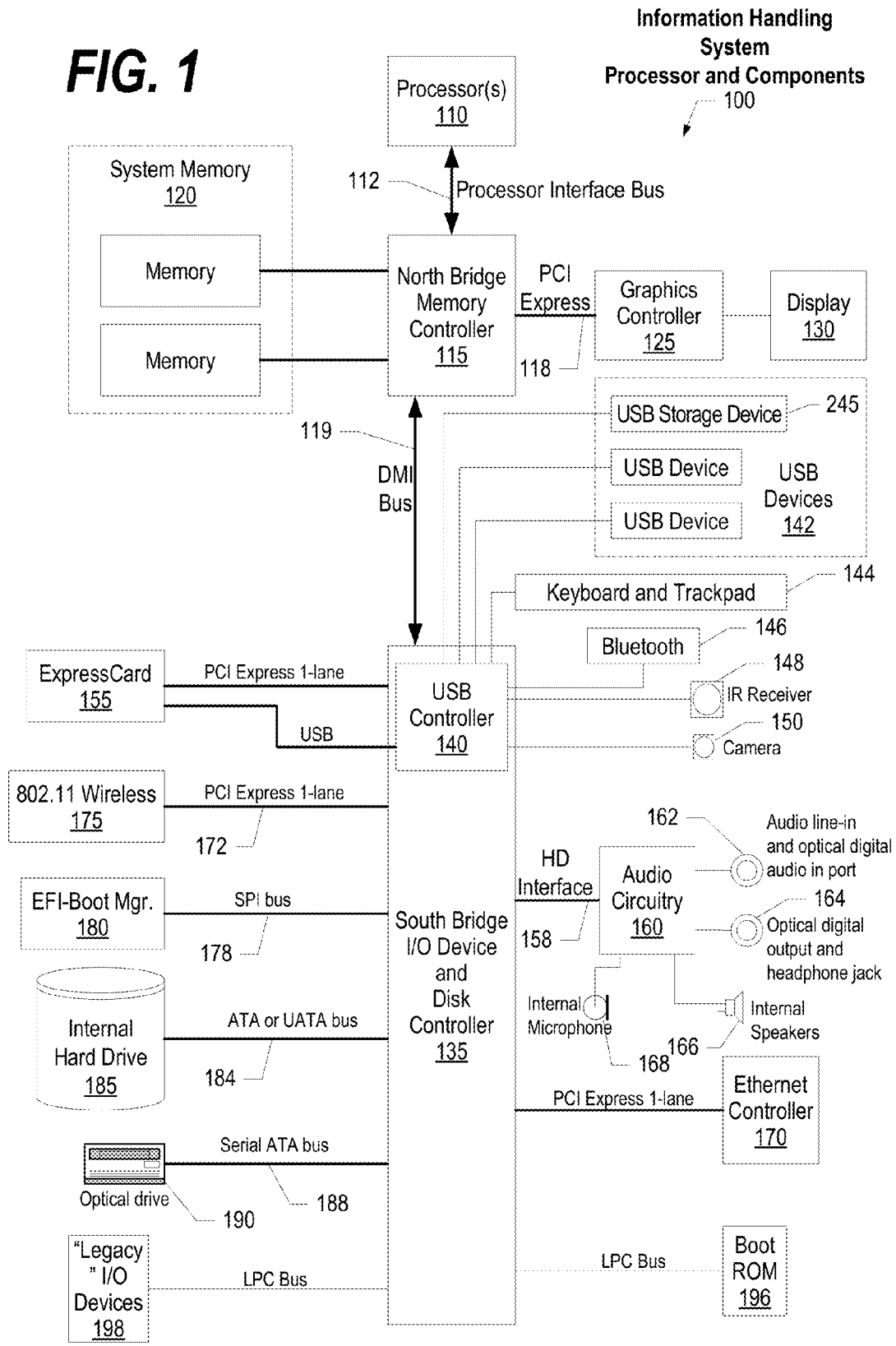
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
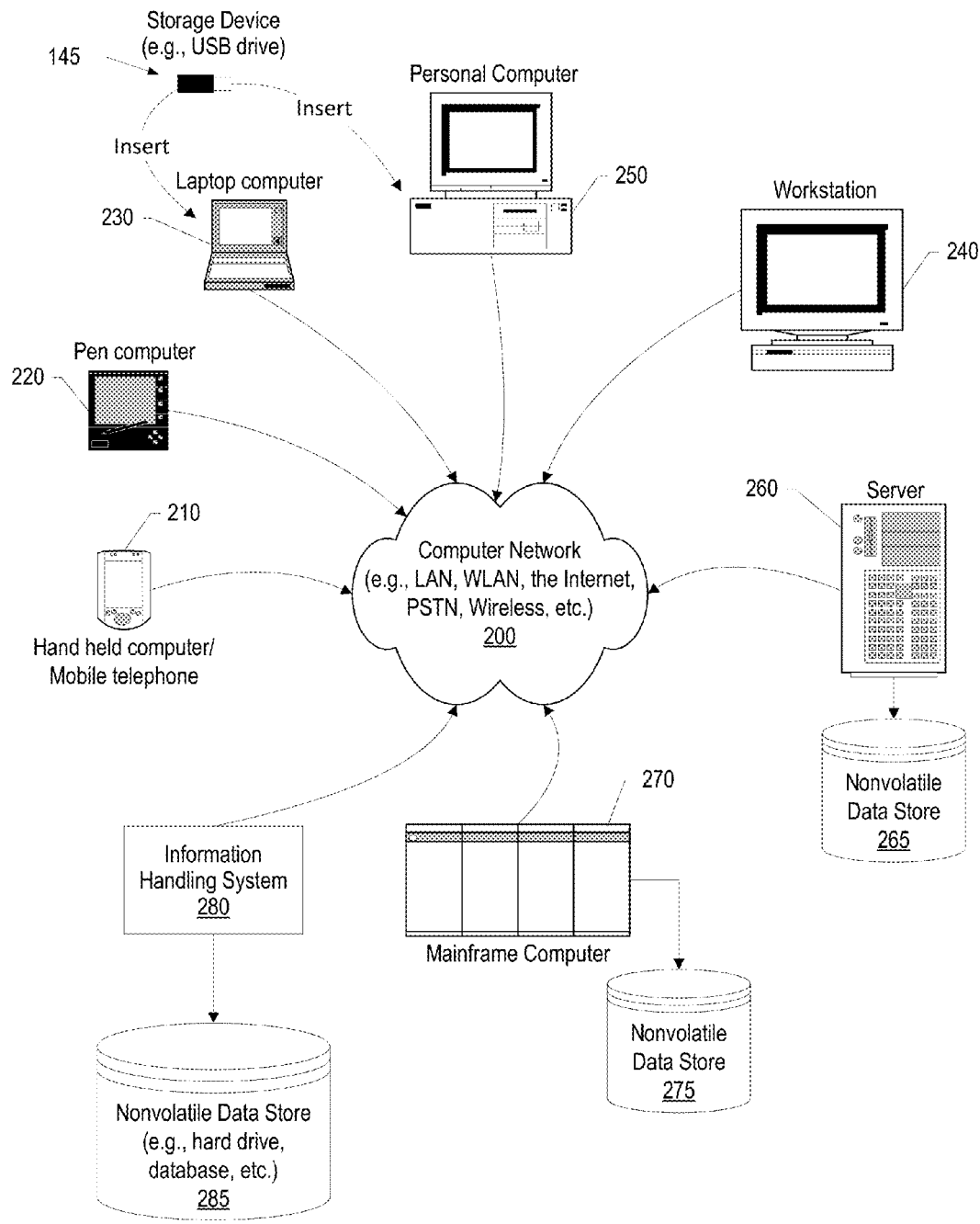
FIG. 2 is a block diagram of a processor and components of an information handling system such as those shown in FIG. 1.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
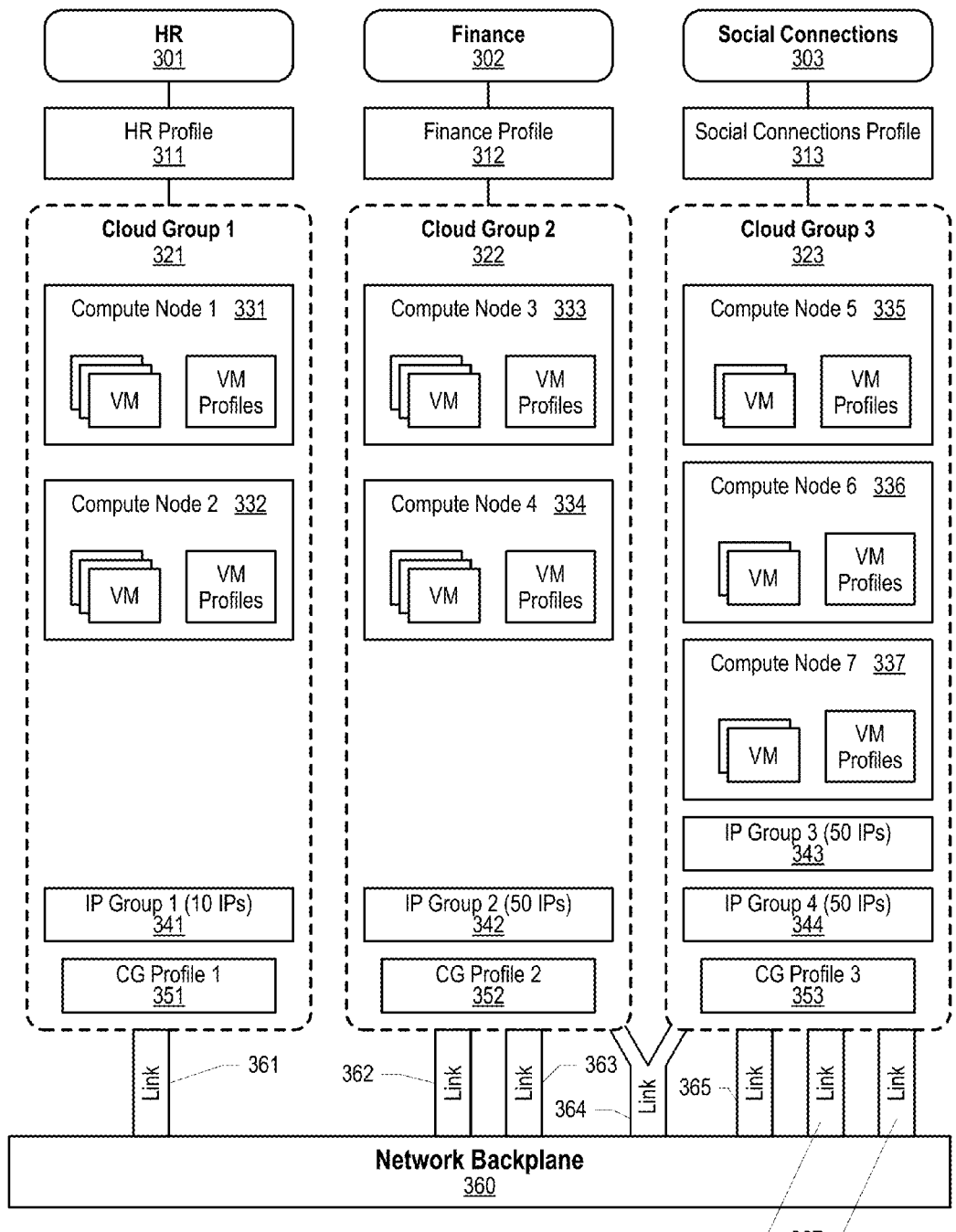
FIG. 3 is a component diagram depicting cloud groups and components prior to a dynamic change being made to the cloud environment.

FIG. 3 is a component diagram depicting cloud groups and components prior to a dynamic change being made to the cloud environment. An information handling system that includes one or more processors and a memory dynamically changes the cloud computing environment shown in FIG. 1. Deployed workloads are running in each of the cloud groups 321, 322, and 333. In the example shown, workloads for Human Resources 301 are running on Cloud Group 321 with the workloads being configured based upon HR Profile 311. Likewise, workloads for Finance 302 are running on Cloud Group 322 with the workloads being configured based upon Finance Profile 312. Workloads for Social Connections 303 are running on Cloud Group 323 and with the workloads being configured based upon HR Profile 313.

The cloud computing environment includes each of cloud groups 321, 322, and 333 and provides computing resources to the deployed workloads. The set of computing resources include resources such as CPU and memory assigned to the various compute nodes (nodes 331 and 332 are shown running in Cloud Group 321, nodes 333 and 334 are shown running in Cloud Group 322, and nodes 335, 336, and 337 are shown running in Cloud Group 323). Resources also include IP addresses. IP addresses for Cloud Group 321 are shown as IP Group 341 with ten IP addresses, IP addresses for Cloud Group 322 are shown as IP Group 342 with fifty IP addresses, and IP addresses for Cloud Group 323 are shown as IP Groups 343 and 344, each with fifty IP addresses per group. Each Cloud Group has a Cloud Group Profile (CG Profile 351 being the profile for Cloud Group 321, CG Profile 352 being the profile for Cloud Group 322, and CG Profile 353 being the profile for Cloud Group 323). The computing resources made available by the cloud computing environment are allocated amongst the cloud groups based on the sets of computing resources assigned to the workloads running in each of the cloud groups. The cloud computing environment also provides Network Backplane 360 that provides network connectivity to the various Cloud Groups. Links are provided so that Cloud Groups with more links assigned have greater network bandwidth. In the example shown, the Human Resources Cloud Group 321 has one network link 361. However, Finance Cloud Group 322 has two full network links assigned (links 362 an 363) as well as a partial link 364 which is shared with Social Connections Cloud Group 323. Social Connections Cloud Group 323 shares link 364 with the Finance Cloud Group and also has been assigned three more network links (365, 366, and 367).

In the following example shown in FIGS. 3 and 4, the Finance application running in Cloud Group 322 required increase security and priority in the following month since its the month where employee's receive bonuses. The application therefore requires it be more highly available and have higher security. These updated requirements come in the form of a modified Cloud Group Profile 353. Processing of the updated Cloud Group Profile 353 determines that the current configuration shown in FIG. 3 does not support these requirements and therefore needs to be reconfigured.

Figure 4:
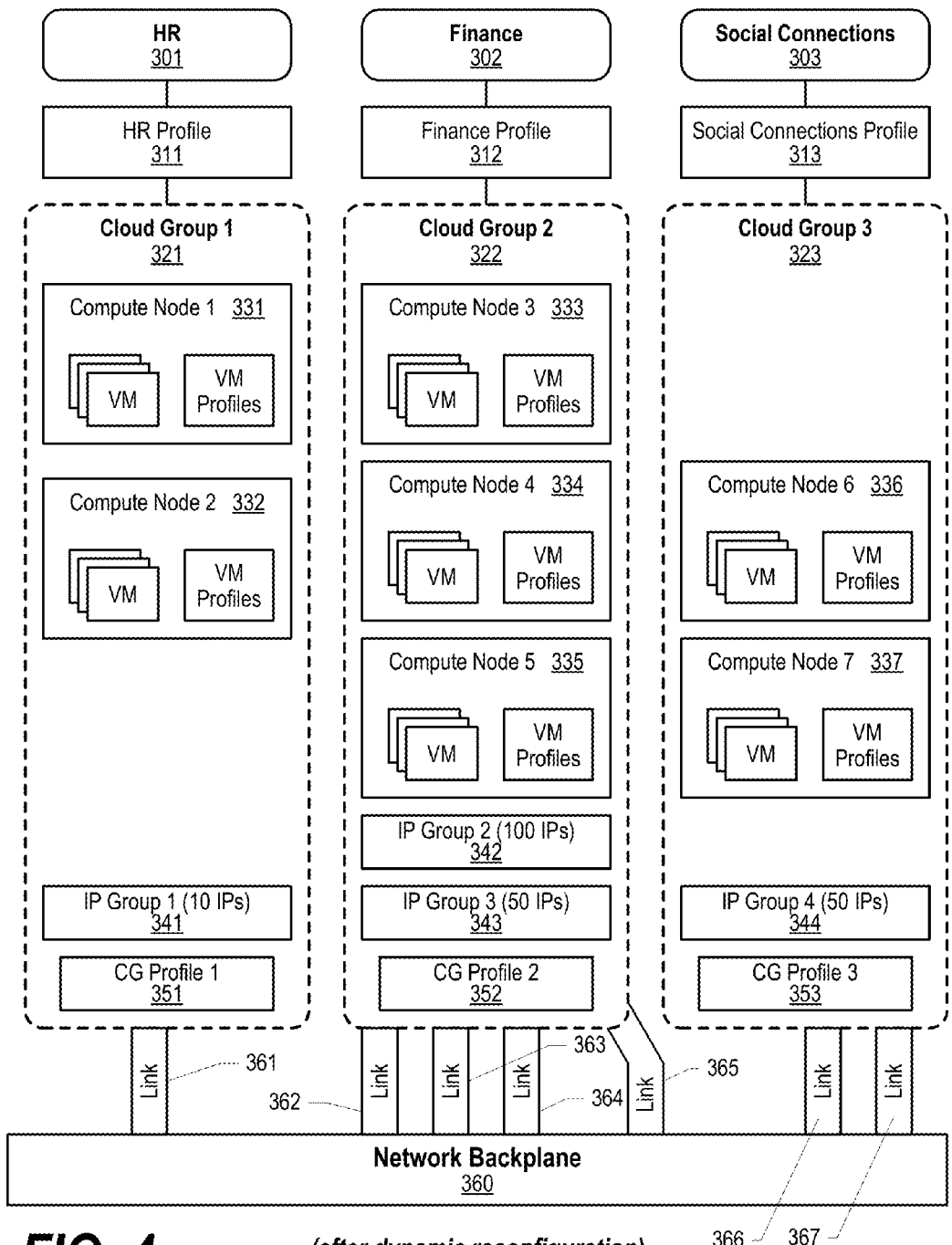
FIG. 4 is a component diagram depicting cloud groups and components after a dynamic change has been performed on the cloud environment based on moving workloads.
Figure 5:
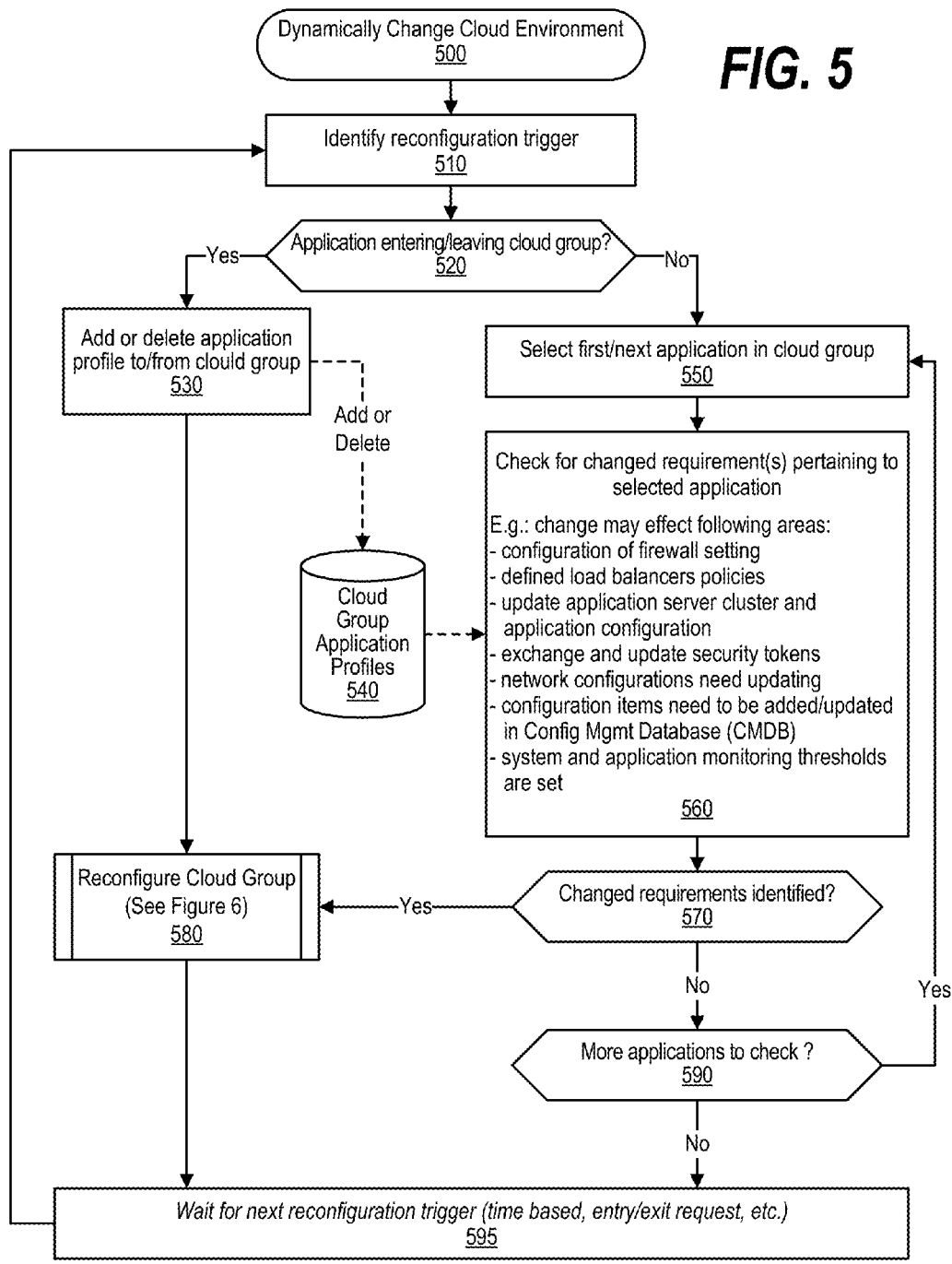
FIG. 5 is a depiction of a flowchart showing the logic used to dynamically change a cloud environment.

As shown in FIG. 4, a free compute node (compute node 335) is pulled into the Cloud Group 322 from Cloud Group 323 to increase the application's availability. The updated security requirements restrict access on the firewall and increases the security encryption. As shown in FIG. 4, the network connections are reconfigured to be physically isolated further improve security. Specifically notice how network link 364 is no longer shared with the Social Connections Cloud Group. In addition, due to the increased network demands now found for the Finance Cloud Group, one of the network links (link 365) formerly assigned to the Social Connections Group is now assigned to the Finance Group. After the reassignment of resources, the Cloud Group Profile is correctly configured and the Finance application's requirements are met. Note that in FIG. 3, the Social Connections applications were running with High security and High priority, the Internal HR applications were running with Low security and Low Priority, and the Internal Finance applications were running with Medium security and Medium priority. After the reconfiguration due to the changes to the Finance Profile 312, the Social Connections applications are still running with Medium security and Medium priority, but the Internal HR applications are running with High security and High Priority and the Internal Finance applications are also running with High security and High priority FIG. 5 is a depiction of a flowchart showing the logic used to dynamically change a cloud environment. Processing commences at 500 whereupon, at step 510, the process identifies a reconfiguration trigger that instigated the dynamic change to the cloud environment. A decision is made by the process as to whether the reconfiguration trigger was an application that is either entering or leaving a cloud group (decision 520). If the reconfiguration trigger is an application that is entering or leaving a cloud group, then decision 520 branches to the "yes" branch for further processing.

At step 530, the process adds or deletes the application profile that corresponds to the application that is entering or leaving to/from cloud group application profiles that are stored in data store 540. Cloud group application profiles stored in data store 540 include the application, by cloud group, currently running in the cloud computing environment. At predefined process 580, the process reconfigures the cloud group after the cloud group profile has been adjusted by step 530 (see FIG. 6 and corresponding text for processing details). At step 595, processing waits for the next reconfiguration trigger to occur, at which point processing loops back to step 510 to handle the next reconfiguration trigger.

Returning to decision 520, if the reconfiguration trigger was not due to an application entering or leaving the cloud group, then decision 520 branches to the "no" branch for further processing. At step 550, the process selects the first application currently running in the cloud group. At step 560, the process checks for changed requirements that pertain to the selected application by checking the selected application's profile. The changed requirements may effect areas such as the configuration of a firewall setting, defined load balancers policies, an update to an application server cluster and application configuration, an exchange and update of security tokens, network configurations that need updating, configuration items that need to be added/updated in Configuration Management Database (CMDB), and the setting of system and application monitoring thresholds. A decision is made by the process as to whether changed requirements pertaining to the selected application were identified in step 560 (decision 570). If changed requirements were identified that pertain to the selected application, then decision 570 branches to the "yes" branch whereupon, predefined process 580 executes to reconfigure the cloud group (see FIG. 6 and corresponding text for processing details). On the other hand, if no changed requirements were identified that pertain to the selected application, then processing branches to the "no" branch. A decision is made by the process as to whether there are additional applications in the cloud group to check (decision 590). If there are additional applications to check, then decision 590 branches to the "yes" branch which loops back to select and process the next application in the cloud group as described above. This looping continues until either an application with changes requirements is identified (with decision 570 branching to the "yes" branch) or until there are no more applications to select in the cloud group (with decision 590 branching to the "no" branch). If there are no more applications to select in the cloud group, then decision 590 branches to the "no" branch whereupon, at step 595 processing waits for the next reconfiguration trigger to occur, at which point processing loops back to step 510 to handle the next reconfiguration trigger.

Figure 6:
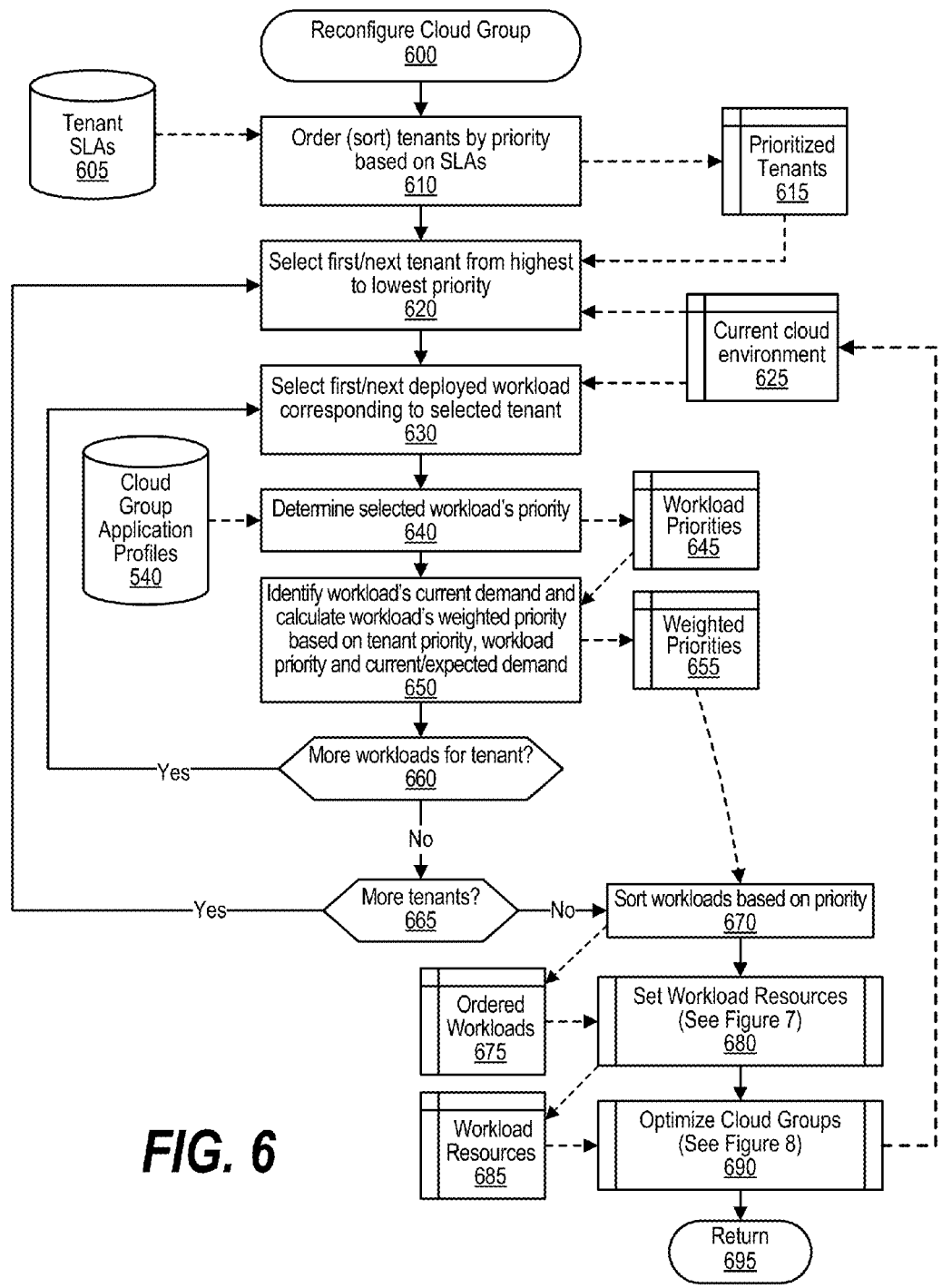
FIG. 6 is a depiction of a flowchart showing the logic performed to reconfigure a cloud group.

FIG. 6 is a depiction of a flowchart showing the logic performed to reconfigure a cloud group. The reconfigure process commences at 600 whereupon, at step 610, the process orders the set of tenants running on the cloud group by priority based on the Service Level Agreements (SLAs) in place for the tenants. The process receives the tenant SLAs from data store 605 and stores the list of prioritized tenants in memory area 615.

At step 620, the process selects the first (highest priority) tenant from the list of prioritized tenants stored in memory area 615. The workloads corresponding to the selected tenant are retrieved from the current cloud environment which is stored in memory area 625. At step 630 the process selects the first workload that is deployed for the selected tenant. At step 640, the process determines, or calculates, a priority for the selected workload. The workload priority is based on the priority of the tenant as set in the tenant SLA as well as the application profile that is retrieved from data store 540. A given tenant can assign different priorities to different applications based on the needs of the application and the importance of the application to the tenant. FIGS. 3 and 4 provided an example of different priorities being assigned to different applications running in a given enterprise. The workload priorities are then stored in memory area 645. At step 650, the process identifies the workload's current demand and also calculates the workload's weighted priority based on the tenant priority, the workload priority and the current, or expected, demand for the workload. The weighted priorities for the workloads are stored in memory area 655. A decision is made by the process as to whether there are more workloads for the selected tenant that need to be processed (decision 660). If there are more workloads for the selected tenant to process, then decision 660 branches to the "yes" branch which loops back to step 630 to select and process the next workload as described above. This looping continues until there are no more workloads for the tenant to process, at which point decision 660 branches to the "no" branch.

A decision is made by the process as to whether there are more tenants to process (decision 665). If there are more tenants to process, then decision 665 branches to the "yes" branch which loops back to select the next tenant, in terms of priority, and process the workloads for the newly selected tenant as described above. This looping continues until all of the workloads for all of the tenants have been processed, at which point decision 665 branches to the "no" branch for further processing.

At step 670, the process sorts the workloads based on the weighted priorities found in memory area 655. The workloads, ordered by their respective weighted priorities, are stored in memory area 675. At predefined process 680, the process sets workload resources for each of the workloads included in memory area 675 (see FIG. 7 and corresponding text for processing details). Predefined process 680 stores the allocated workload resources in memory area 685. At predefined process 680, the process optimizes the cloud groups based upon the allocated workload resources stored in memory area 685 (see FIG. 8 and corresponding text for processing details). The process then returns to the calling routine (see FIG. 5) at 695.

Figure 7:
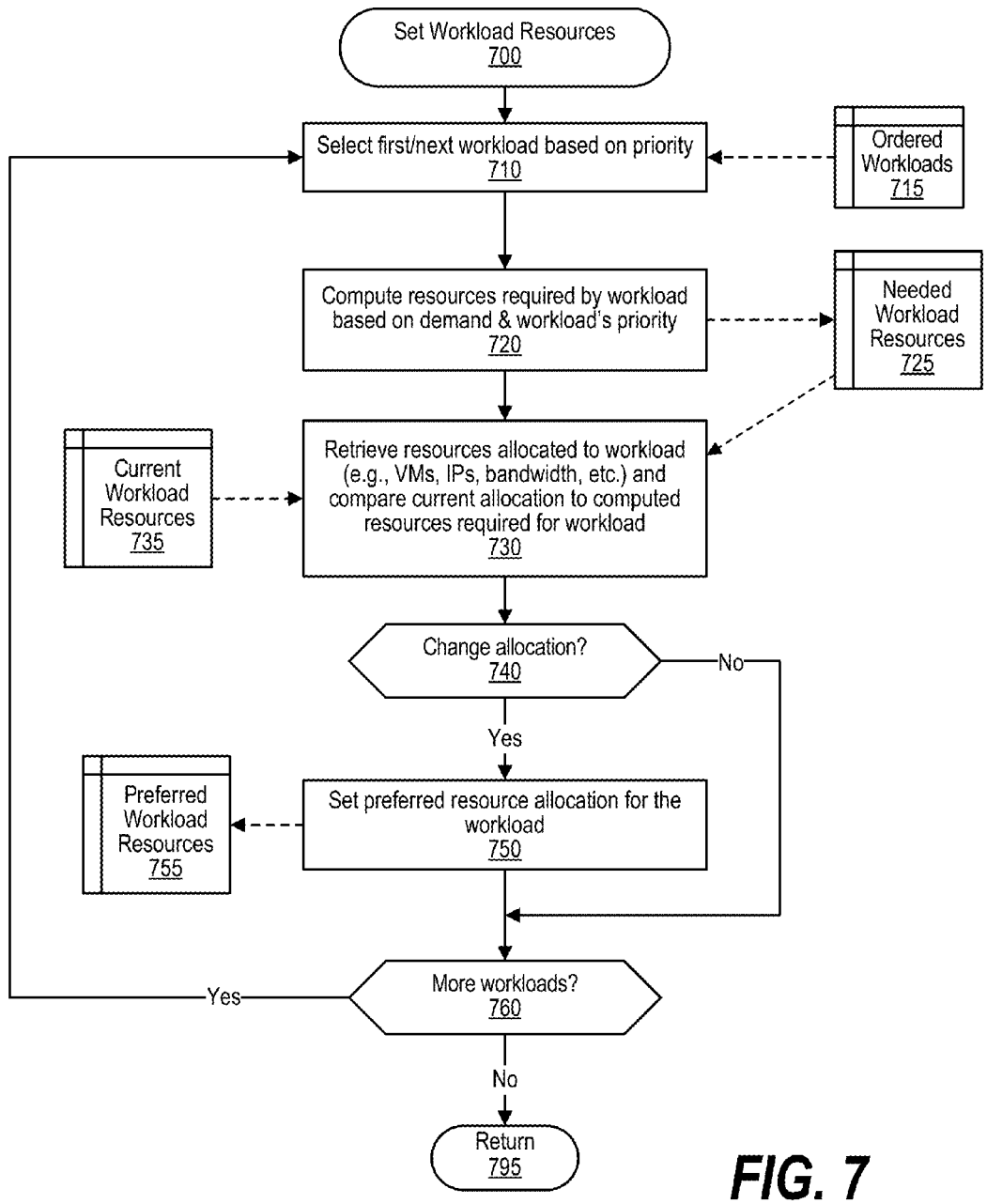
FIG. 7 is a depiction of a flowchart showing the logic used to set workload resources.

FIG. 7 is a depiction of a flowchart showing the logic used to set workload resources. Processing commences at 700 whereupon, at step 710, the process selects the first (highest weighted priority) workload from memory area 715, with memory area 715 previously being sorted from highest weighted priority workload to the lowest weighted priority workload.

At step 720, the process computes the resources required by the selected workload based on the workload's demand and the workload's priority. The resources needed to run the workload given the workload's demand and priority are stored in memory area 725.

At step 730, the process retrieve the resources allocated to the workload, such as the number of VMs, the IP addresses needed, the network bandwidth, etc., and compares the workload's current resource allocation to the workload's computed resources required for workload. A decision is made by the process as to whether a change is needed to the workload's resource allocation based on the comparison (decision 740). If a change is needed to the workload's resource allocation, then decision 740 branches to the "yes" branch whereupon, at step 750, the process sets a "preferred" resource allocation for the workload which is stored in memory area 755. The "preferred" designation means that if resources are amply available, these are the resources that the workload should have allocated. However, due to resource constraints in the cloud group, the workload may have to settle for an allocation that is less than the preferred workload resource allocation. Returning to decision 740, if the workload has already been allocated the resources needed, then decision 740 branches to the "no" branch bypassing step 750.

A decision is made by the process as to whether there are more workloads, ordered by weighted priority, that need to be processed (decision 760). If there are more workloads to process, then decision 760 branches to the "yes" branch which loops back to step 710 to select the next (next highest weighted priority) workload and set the newly selected workload's resources as described above. This looping continues until all of the workloads have been processed, at which point decision 760 branches to the "no" branch and processing returns to the calling routine (see FIG. 6) at 795.

Figure 8:
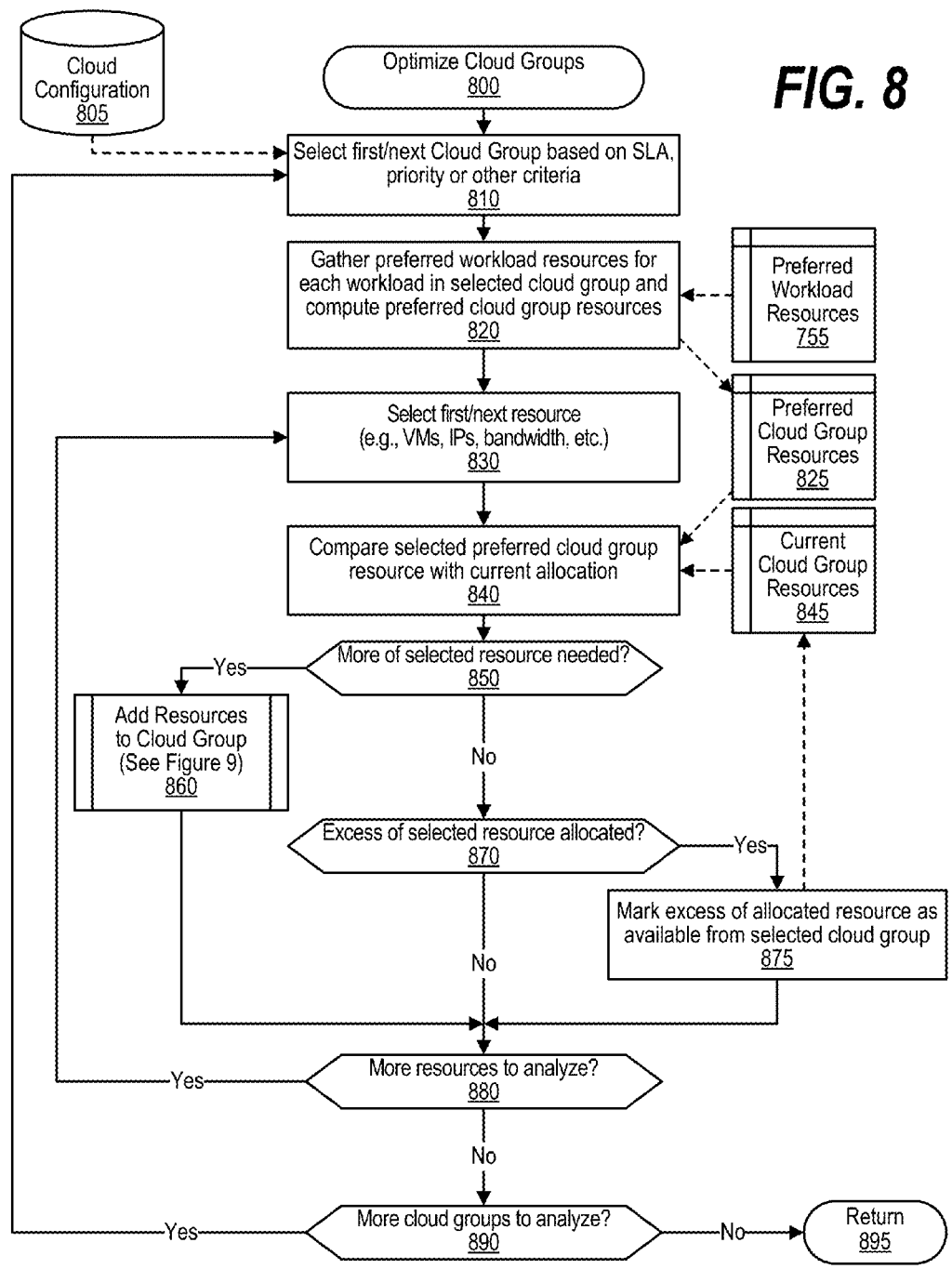
FIG. 8 is a depiction of a flowchart showing the logic used to optimize cloud groups.

FIG. 8 is a depiction of a flowchart showing the logic used to optimize cloud groups. Processing commences at 800 whereupon, at step 810, the process selects the first cloud group from the cloud configuration stored in data store 805. The cloud groups may be sorted based on Service Level Agreements (SLAs) applying to the various groups, based on a priority assigned to the various cloud groups, or based on some other criteria.

At step 820, the process gathers the preferred workload resources for each workload in selected cloud group and compute the preferred cloud group resources (total resources needed by the cloud group) to satisfy the preferred workload resources of workload's running in the selected cloud group. The preferred workload resources are retrieved from memory area 755. The computed preferred cloud group resources needed to satisfy the workload resources of the workloads running in the selected cloud group are stored in memory area 825.

At step 830, the process selects the first resource type available in the cloud computing environment. At step 840, the selected resource is compared with the current allocation of the resource already allocated to the selected cloud group. The current allocation of resources for the cloud group is retrieved from memory area 845. A decision is made by the process as to whether more of the selected resource is needed by the selected cloud group to satisfy the workload resources of the workloads running in the selected cloud group (decision 850). If more of the selected resource is needed by the selected cloud group, then decision 850 branches to the "yes" branch whereupon, at predefined process 860, the process adds resources to the selected cloud group (see FIG. 9 and corresponding text for processing details). On the other hand, if more of the selected resource is not needed by the selected cloud group, then decision 850 branches to the "no" branch whereupon a decision is made by the process as to whether an excess of the selected resource is currently allocated to the cloud group (decision 870). If an excess of the selected resource is currently allocated to the cloud group, then decision 870 branches to the "yes" branch whereupon, at step 875, the process marks the excess of the allocated resources as being "available" from the selected cloud group. This marking is made to the list of cloud group resources stored in memory area 845. On the other hand, if an excess of the selected resource is not currently allocated to the selected cloud group, then decision 870 branches to the "no" branch bypassing step 875.

A decision is made by the process as to whether there are more resource types to analyze (decision 880). If there are more resource types to analyze, then decision 880 branches to the "yes" branch which loops back to step 830 to select and analyze the next resource type as described above. This looping continues until all of the resource types have been processed for the selected cloud group, at which point decision 880 branches to the "no" branch. A decision is made by the process as to whether there are more cloud groups to select and process (decision 890). If there are more cloud groups to select and process, then decision 890 branches to the "yes" branch which loops back to step 810 to select and process the next cloud group as described above. This looping continues until all of the cloud groups have been processed, at which point decision 890 branches to the "no" branch and processing returns to the calling routine (see FIG. 6 at 895.

Figure 9:
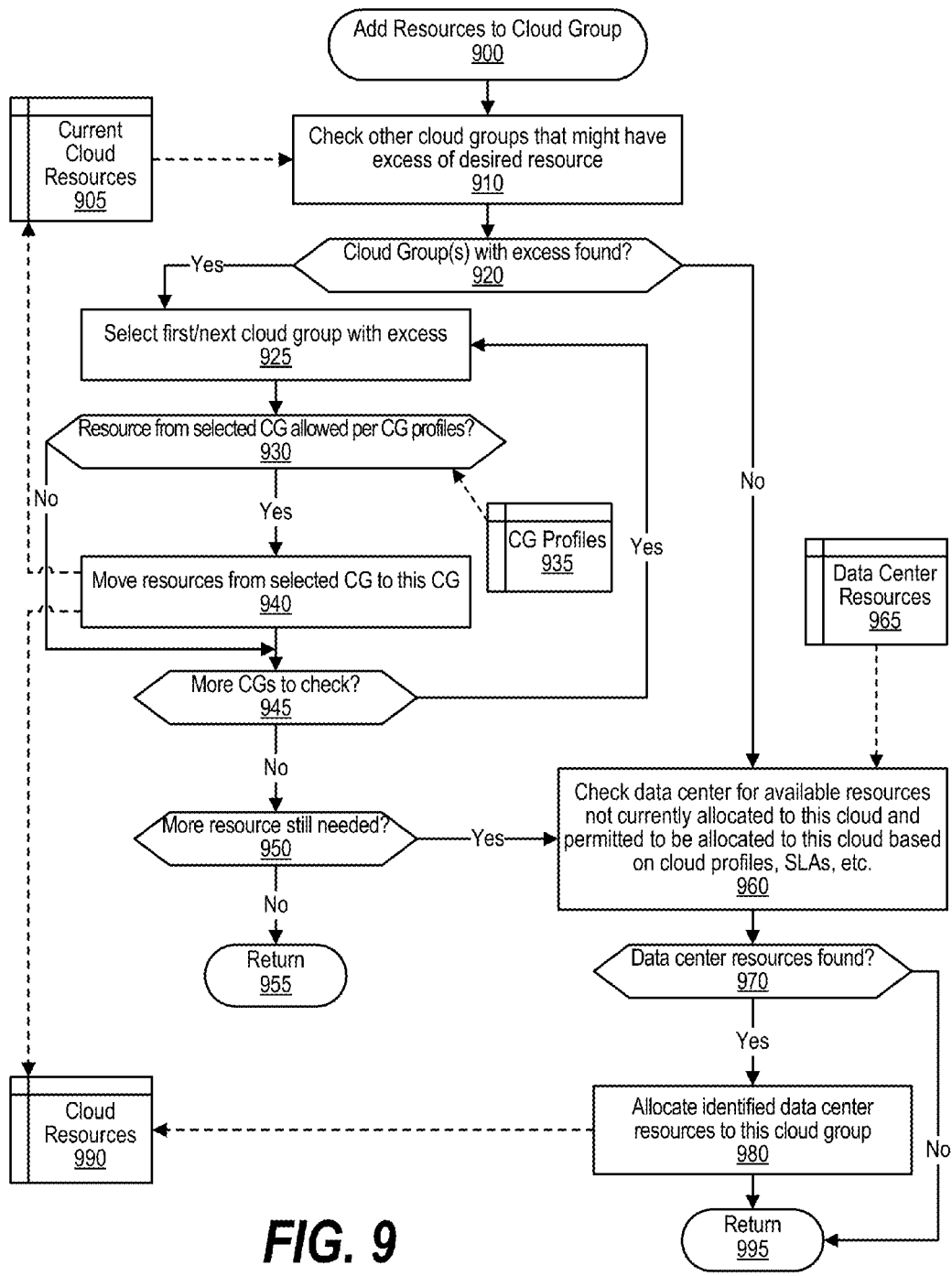
FIG. 9 is a depiction of a flowchart showing the logic used to add resources to a cloud group.

FIG. 9 is a depiction of a flowchart showing the logic used to add resources to a cloud group. Processing commences at 900 whereupon, at step 910, the process checks other cloud groups running in the cloud computing environment to possibly find other cloud groups with an excess of the resource desired by this cloud group. As previously shown in FIG. 8, when a cloud group identifies an excess of a resource, the excess resource is marked and made available to other cloud groups. The list of all the cloud resources (each of the cloud groups) and their resource allocation as well as excel resources, is listed in memory area 905.

A decision is made by the process as to whether one or more cloud groups were identified that have an excess of the desired resource (decision 920). If one or more cloud groups are identified with an excess of the desired resource, then decision 920 branches to the "yes" branch whereupon, at step 925, the process selects the first cloud group with an identified excess of the desired (needed) resource. A decision is made by the process, based on both the selected cloud group's profile and the other cloud group's profile retrieved from memory area 935, as to whether this cloud group is allowed to receive the resource from the selected cloud group (decision 930). For example, in FIGS. 3 and 4 a scenario was presented where one cloud group (the Finance group) had a high security setting due to sensitivity in the work being performed in the Finance group. This sensitivity may have prevented some resources, such as a network link, from being shared or reallocated from the Finance group to one of the other cloud groups. If the resource can be moved from the selected cloud group to this cloud group, then decision 930 branches to the "yes" branch whereupon, at step 940, the resource allocation is moved from the selected cloud group to this cloud group and reflected in the list of cloud resources stored in memory area 905 and in the cloud resources stored in memory area 990. On the other hand, if the resource cannot be moved from the selected cloud group to this cloud group, then decision 930 branches to the "no" branch bypassing step 940. A decision is made by the process as to whether there are more cloud groups with resources to check (decision 945). If there are more cloud groups to check, then decision 945 branches to the "yes" branch which loops back to step 925 to select and analyze the resources that might be available from the next cloud group. This looping continues until there are no more cloud groups to check (or until the resource need has been satisfied), at which point decision 945 branches to the "no" branch.

A decision is made by the process as to whether the cloud group still needs more of the resource after checking for excess resources available from other cloud groups (decision 950). If no more resources are needed, then decision 950 branches to the "no" branch whereupon processing returns to the calling routine (see FIG. 8) at 955. On the other hand, if more resources are still needed for this cloud group, then decision 950 branches to the "yes" branch for further processing.

At step 960, the process checks with the data center for available resources that are not currently allocated to this cloud computing environment and which are permitted to be allocated to this cloud computing environment based on cloud profiles, SLAs, etc. The data center resources are retrieved from memory area 965. A decision is made by the process as to whether data center resources were found that satisfy the resource need of this cloud group (decision 970). If data center resources were found that satisfy the resource need of this cloud group, then decision 970 branches to the "yes" branch whereupon, at step 980, the process allocates the identified data center resources to this cloud group. The allocation to this cloud group is reflected in an update to the list of cloud resources stored in memory area 990. Returning to decision 970, if the data center resources were not found to satisfy this cloud group's resource need, then decision 970 branches to the "no" branch bypassing step 980. Processing then returns to the calling routine (see FIG. 8) at 995.

Figure 10:
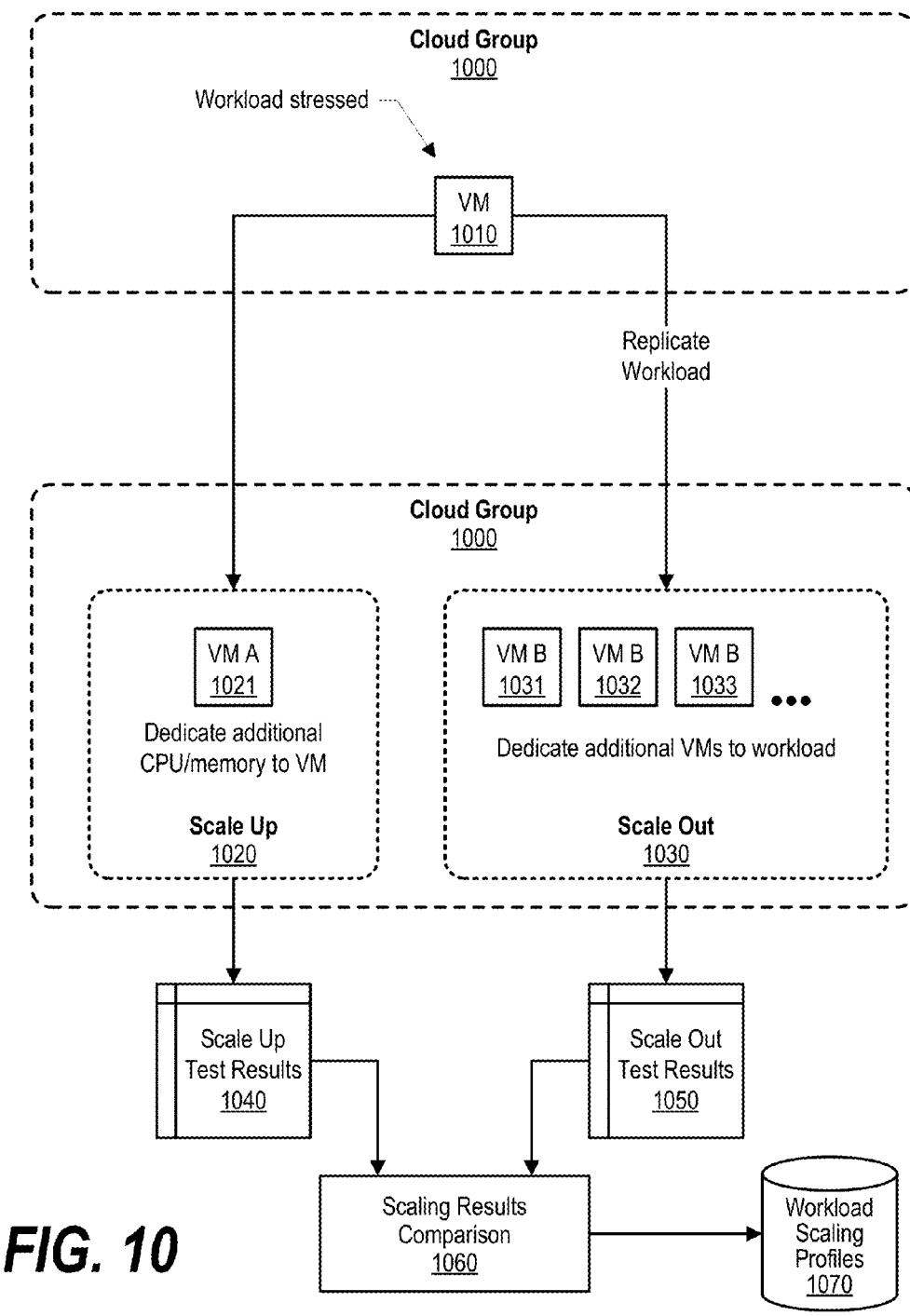
FIG. 10 is a depiction of components used to dynamically move heterogeneous cloud resources based on a workload analysis.

FIG. 10 is a depiction of components used to dynamically move heterogeneous cloud resources based on a workload analysis. Cloud group 1000 shows a workload (virtual machine (VM) 1010) that has been identified as "stressed." After the VM has been identified as stressed, the workload is replicated in order to ascertain whether scaling "up" or "out" is more beneficial to the workload.

Box 1020 depicts an altered VM (VM 1021) that has been scaled "up" by dedicating additional resources, such as CPU and memory, to the original VM 1010. Box 1030 depicts a replicated VM that has been scaled out by adding additional virtual machines to the workload (VMs 1031, 1032, and 1033).

The scaled up environment is tested and the test results are stored in memory area 1040. Likewise, the scaled out environment is tested and the test results are stored in memory area 1050. Process 1060 is shown comparing the scale up test results and the scale out test results. Process 1060 results in one or more workload scaling profiles that are stored in data store 1070. The workload scaling profiles would indicate the preferential scaling technique (up, out, etc.) for the workload as well as the configuration settings (e.g., allocated resources if scale up, number of virtual machines if scale out). In addition, a scale "diagonal" is possible by combining some aspects of the scale up with some aspects of the scale out (e.g., increasing the allocated resources as well as dedicating additional virtual machines to the workload, etc.).

Figure 11:
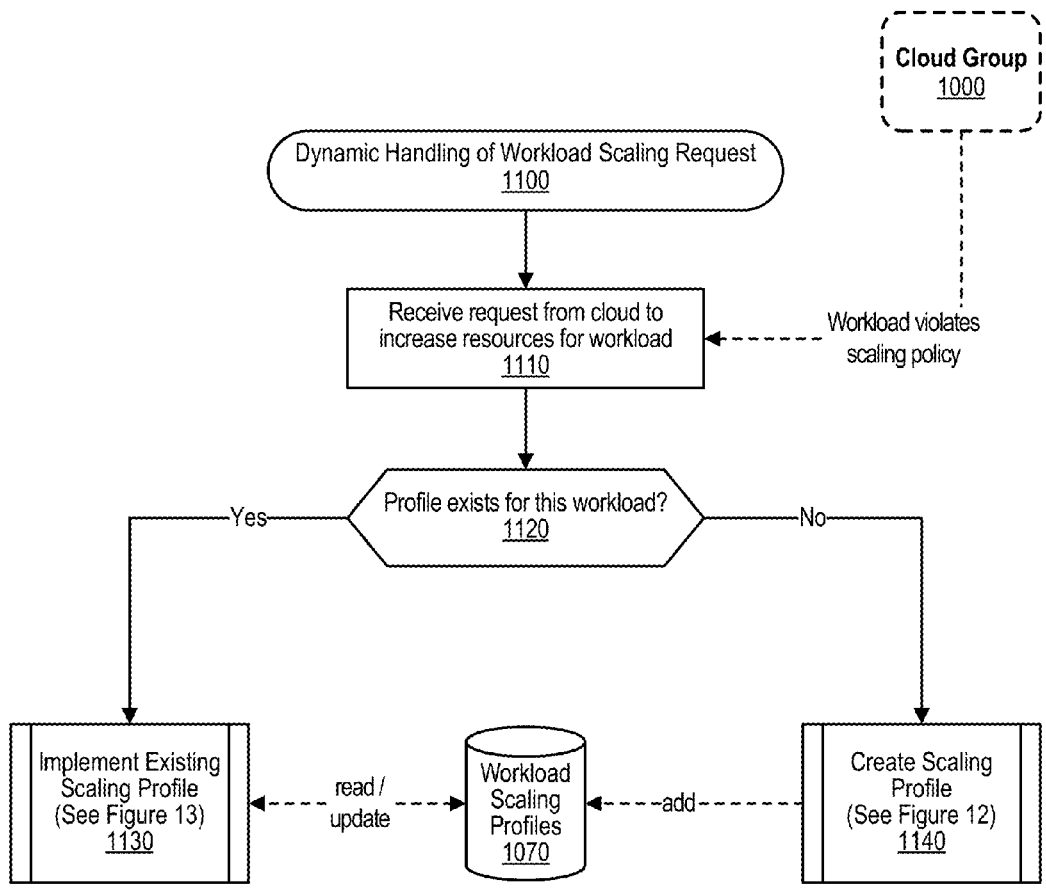
FIG. 11 is a depiction of a flowchart showing the logic used in dynamic handling of a workload scaling request.

FIG. 11 is a depiction of a flowchart showing the logic used in dynamic handling of a workload scaling request. Process commences at 1100 whereupon, at step 1110, the process receives a request from a cloud (cloud group 1000) to increase the resources for a given workload. For example, the performance of the workload may have been below a given threshold or may have violated a scaling policy.

A decision is made by the process as to whether a workload scaling profile already exists for this workload (decision 1120). If a workload scaling profile already exists for this workload, then decision 1120 branches to the "yes" branch whereupon, at predefined process 1130, the process implements the existing scaling profile (see FIG. 13 and corresponding text for processing details) by reading the existing workload scaling profile from data store 1070.

Figure 12:
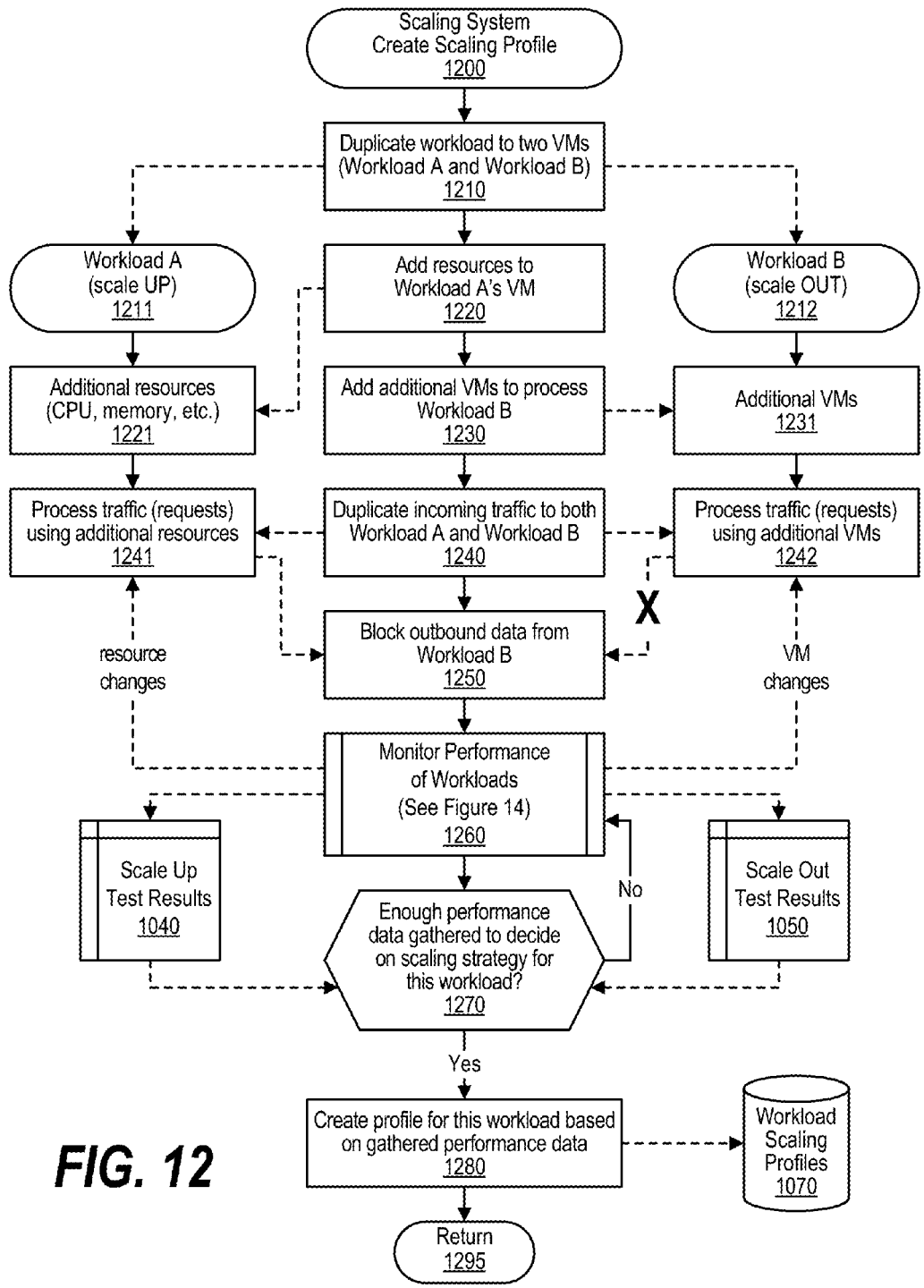
FIG. 12 is a depiction of a flowchart showing the logic used to create a scaling profile by the scaling system.

On the other hand, if a workload scaling profile does not yet exist for this workload, then decision 1120 branches to the "no" branch whereupon, at predefined process 1140, the process creates a new scaling profile for the workload (see FIG. 12 and corresponding text for processing details). The new scaling profile is stored in data store 1070.

FIG. 12 is a depiction of a flowchart showing the logic used to create a scaling profile by the scaling system. Processing commences at 1200 whereupon, at step 1210 the process duplicates the workload to two different virtual machines (Workload "A" 1211 being the workload that is scaled up and Workload "B" 1212 being the workload that is scaled out).

At step 1220, the process adds resources to Workload A's VM. This is reflected in step 1221 with Workload A receiving the additional resources.

At step 1230, the process adds additional VMs that are used to process Workload B. This is reflected in step 1231 with Workload B receiving the additional VMs.

At step 1240, the process duplicates the incoming traffic to both Workload A and Workload B. This is reflected in Workload A's step 1241 processing the traffic (requests) using the additional resources allocated to the VM running Workload A. This is also reflected in Workload B's step 1242 processing the same traffic using the additional VMs that were added to process Workload B.

At step 1250, both Workload A and Workload B direct outbound data (responses) back to the requestor. However, step 1250 blocks the outbound data from one of the workloads (e.g., Workload B) so that the requestor receives only one set of expected outbound data.

Figure 14:
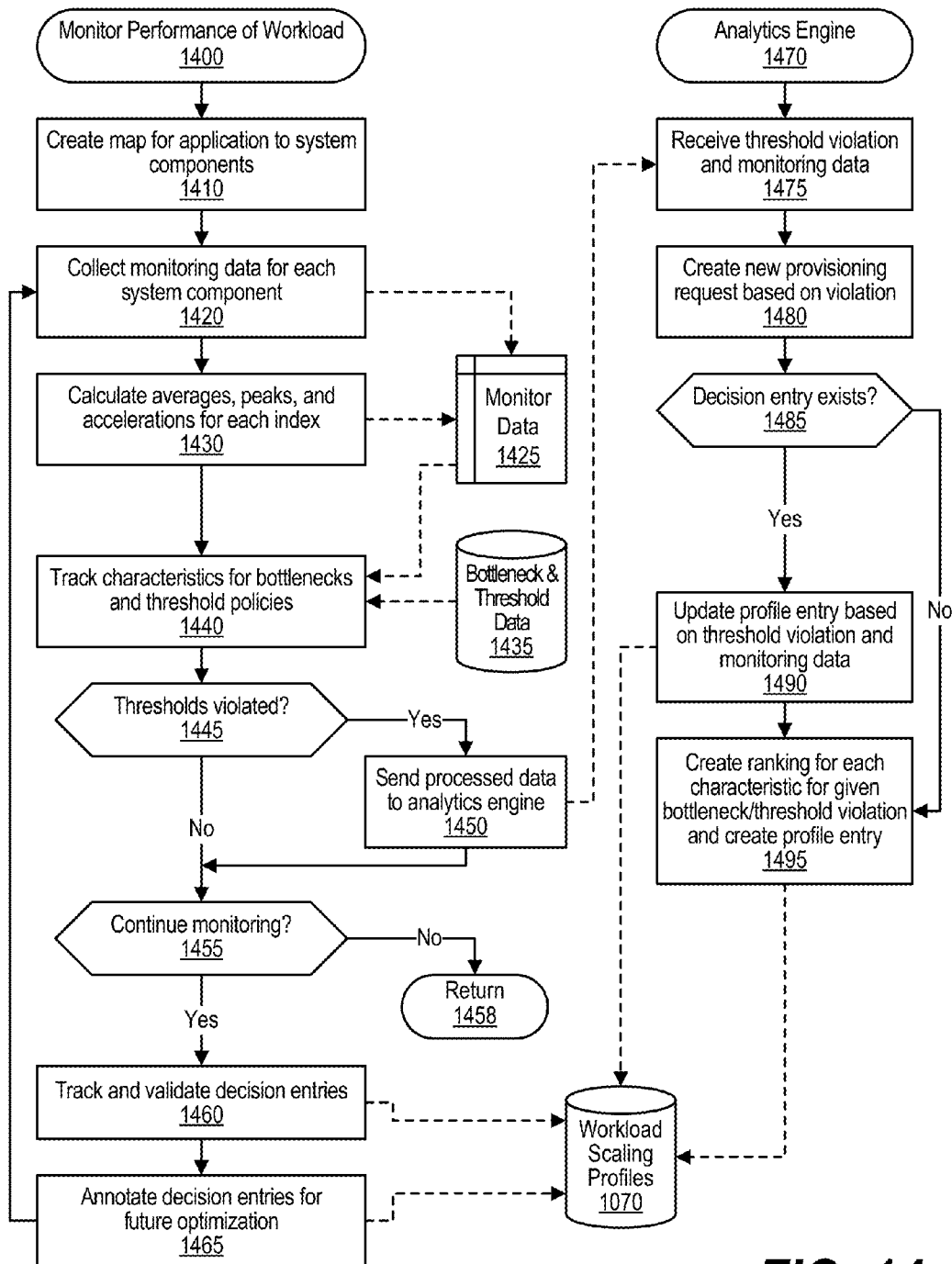
FIG. 14 is a depiction of a flowchart showing the logic used to monitor the performance of a workload using an analytics engine.

At predefined process 1260, the process monitors the performance of both Workload A and Workload B (see FIG. 14 and corresponding text for processing details). Predefined process 1260 stores the results of the scale up (Workload A) in memory area 1040, and the results of the scale out (Workload B) in memory area 1050. A decision is made by the process as to whether enough performance data has been gathered to decide on a scaling strategy for this workload (decision 1270). Decision 1270 may be driven by time or an amount of traffic that is processed by the workloads. If enough performance data has not yet been gathered to decide on a scaling strategy for this workload, then decision 1270 branches to the "no" branch which loops back to predefined process 1260 to continue monitoring the performance of Workload A and Workload B and providing further test results that are stored in memory areas 1040 and 1050, respectively. This looping continues until enough performance data has been gathered to decide on a scaling strategy for this workload, at which point decision 1270 branches to the "yes" branch whereupon, at step 1280, the process creates a workload scaling profile for this workload based on gathered performance data (e.g., preference of scale up, scale out, or scale diagonally and the amount of resources allocated, etc.). Processing then returns to the calling routine (see FIG. 11) at 1295.

Figure 13:
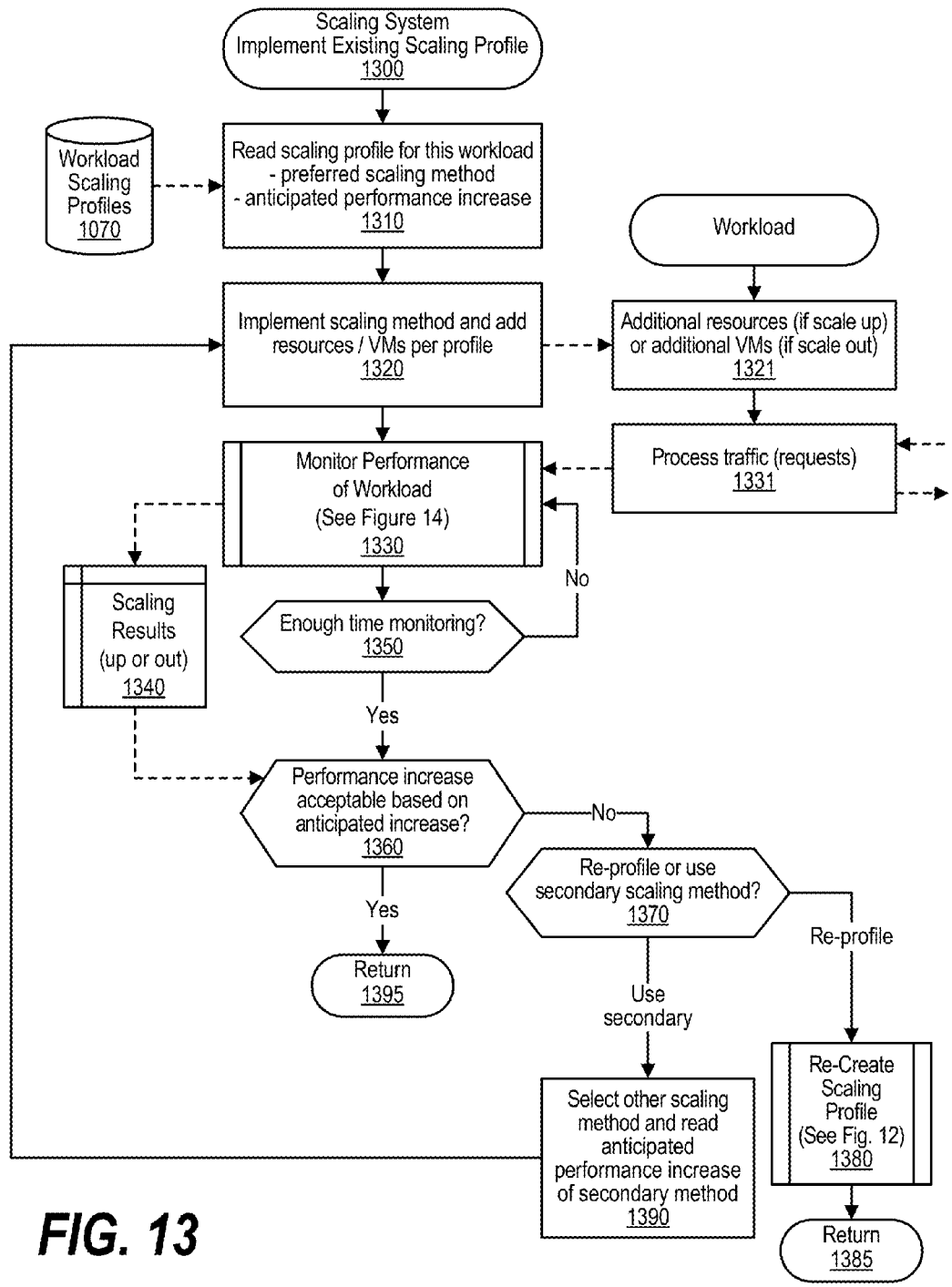
FIG. 13 is a depiction of a flowchart showing the logic used to implement an existing scaling profile.

FIG. 13 is a depiction of a flowchart showing the logic used to implement an existing scaling profile. Processing commences at 1300 whereupon, at step 1310, the process reads the workload scaling profile for this workload including the preferred scaling method (up, out, diagonal), the resources to allocate, and the anticipated performance increase after the preferred scaling has been performed.

At step 1320, the process implements the preferred scaling method per the workload scaling profile as well as adding the resources (CPU, memory, etc. when scaling up, VMs when scaling out, both when scaling diagonally). This implementation is reflected in the workload where, at step 1321, the additional resources/VMs are added to the workload. At step 1331, the workload continues to process traffic (requests) received at the workload (with the processing now being performed with the added resources/VMs). At predefined process 1330, the process monitors the performance of the workload (see FIG. 14 and corresponding text for processing details). The results of the monitoring are stored in scaling results memory area 1340 (either scale up results, scale out, or scale diagonal results).

A decision is made by the process as to whether enough time has been spent monitoring the performance of the workload (decision 1350). If enough time has not been spent monitoring the workload, then decision 1350 branches to the "no" branch which loops back to predefined process 1330 to continue monitoring the workload and continue adding scaling results to memory area 1340. This looping continues until enough time has been spent monitoring the workload, at which point decision 1350 branches to the "yes" branch for further processing.

A decision is made by the process as to whether a performance increase, reflected in the scaling results stored in memory area 1340, are acceptable based on the anticipated performance increase (decision 1360). If the performance increase is unacceptable, then decision 1360 branches to the "no" branch whereupon a decision is made by the process as to whether to re-profile the workload or use a secondary scaling method on the workload (decision 1370). If the decision is to re-profile the workload, then decision 1370 branches to the "re-profile" branch whereupon, at predefined process 1380, the scaling profile is re-created for the workload (see FIG. 12 and corresponding text for processing details) and processing returns to the calling routine at 1385.

On the other hand, if the decision is to use a secondary scaling method, then decision 1370 branches to the "use secondary" branch whereupon, at step 1390, the process select another scaling method from the workload scaling profiles and reads the anticipated performance increase when using the secondary scaling method. Processing then loops back to step 1320 to implement the secondary scaling method. This looping continues with other scaling methods being selected and used until either the performance increase of one of the scaling methods is acceptable (with decision 1360 branching to the "yes" branch and processing returning to the calling routine at 1395) or when a decision is made to re-profile the workload (with decision 1370 branching to the "re-profile" branch).

FIG. 14 is a depiction of a flowchart showing the logic used to monitor the performance of a workload using an analytics engine. Processing commences at 1400 whereupon, at step 1410, the process creates a map for application to system components. At step 1420, the process collect monitoring data for each system component which is stored in memory area 1425.

At step 1430, the process calculates averages, peaks, and accelerations for each index and stores the calculations in memory area 1425. At step 1440, the process track characteristics for bottlenecks and threshold policies by using bottleneck and threshold data from data store 1435 in relation to monitor data previously stored in memory area 1425.

A decision is made by the process as to whether any thresholds or bottlenecks are violated (decision 1445). If any thresholds or bottlenecks are violated, then decision 1445 branches to the "yes" branch whereupon, at step 1450, the process sends the processed data to analytics engine 1470 for processing. On the other hand, if thresholds or bottlenecks are not violated, then decision 1445 branches to the "no" branch bypassing step 1450.

A decision is made by the process as to whether to continue monitoring the performance of the workload (decision 1455). If monitoring should continue, then decision 1455 branches to the "yes" branch whereupon, at step 1460, the process tracks and validates the decision entries in the workload scaling profile that corresponds to the workload. At step 1465, the process annotates the decision entries for future optimization of the workload. Processing then loops back to step 1420 to collect monitoring data and process the data as described above. This looping continues until the decision is made to discontinue monitoring the performance of the workload, at which point decision 1455 branches to the "no" branch and processing returns to the calling routine at 1458.

Analytics engine processing is shown commencing at 1470 whereupon, at step 1475, the analytics engine receives the threshold or bottleneck violation and monitoring data from the monitor. At step 1480, the analytics engine creates a new provisioning request based on violation. A decision is made by the analytics engine as to whether a decision entry already exists for the violation (decision 1485). If the decision entry already exists, then decision 1485 branches to the "yes" branch whereupon, at step 1490, the analytics engine updates the profile entry based on the threshold or bottleneck violation and the monitoring data. On the other hand, if the decision entry does not yet exist, then decision 1485 branches to the "no" branch whereupon, at step 1495, the analytics engine creates a ranking for each characteristic for the given bottleneck/threshold violation and creates a profile entry in the workload scaling profile for the workload.

Figure 15:
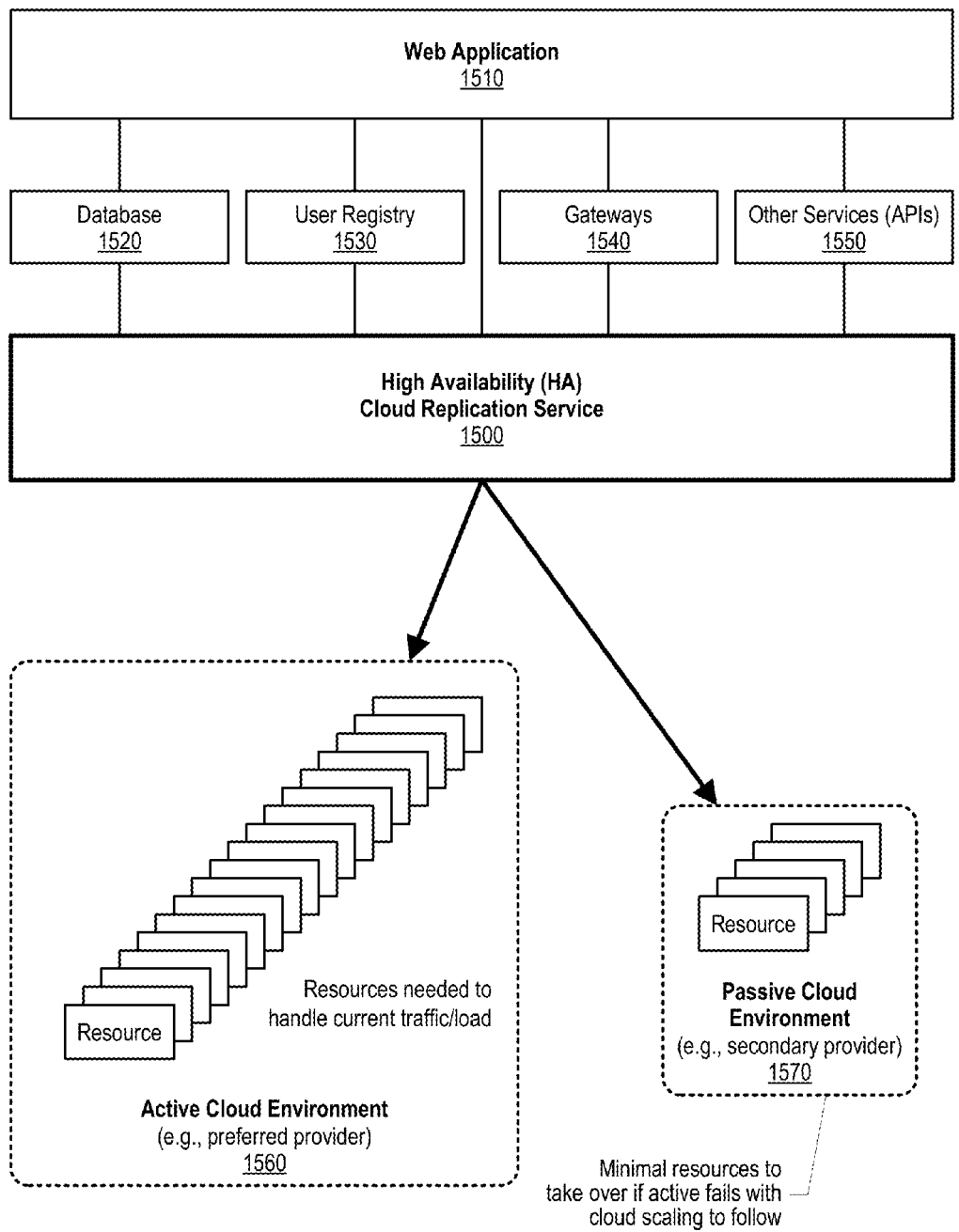
FIG. 15 is a component diagram depicting the components used in implementing a fractional reserve High Availability (HA) cloud using cloud command interception.

FIG. 15 is a component diagram depicting the components used in implementing a fractional reserve High Availability (HA) cloud using cloud command interception. HA Cloud Replication Service 1500 provides Active Cloud Environment 1560 as well as a smaller, fractional, Passive Cloud Environment. An application, such as Web Application 1500 utilizes the HA Cloud Replication Service to have uninterrupted performance of a workload. An application, such as the Web Application, might have various components such as databases 1520, user registries 1530, gateways 1540, and other services that are generally accessed using an application programming interface (API).

As shown, Active Cloud Environment 1560 is provided with resources (virtual machines (VMs), computing resources, etc.) needed to handle the current level of traffic or load experienced by the workload. Conversely, Passive Cloud Environment 1570 is provided with fewer resources than the Active Cloud Environment. Active Cloud Environment 1560 is at a cloud provider, such as a preferred cloud provider, whereas Passive Cloud Environment 1570 is at another cloud provider, such as a secondary cloud provider.

Figure 16:
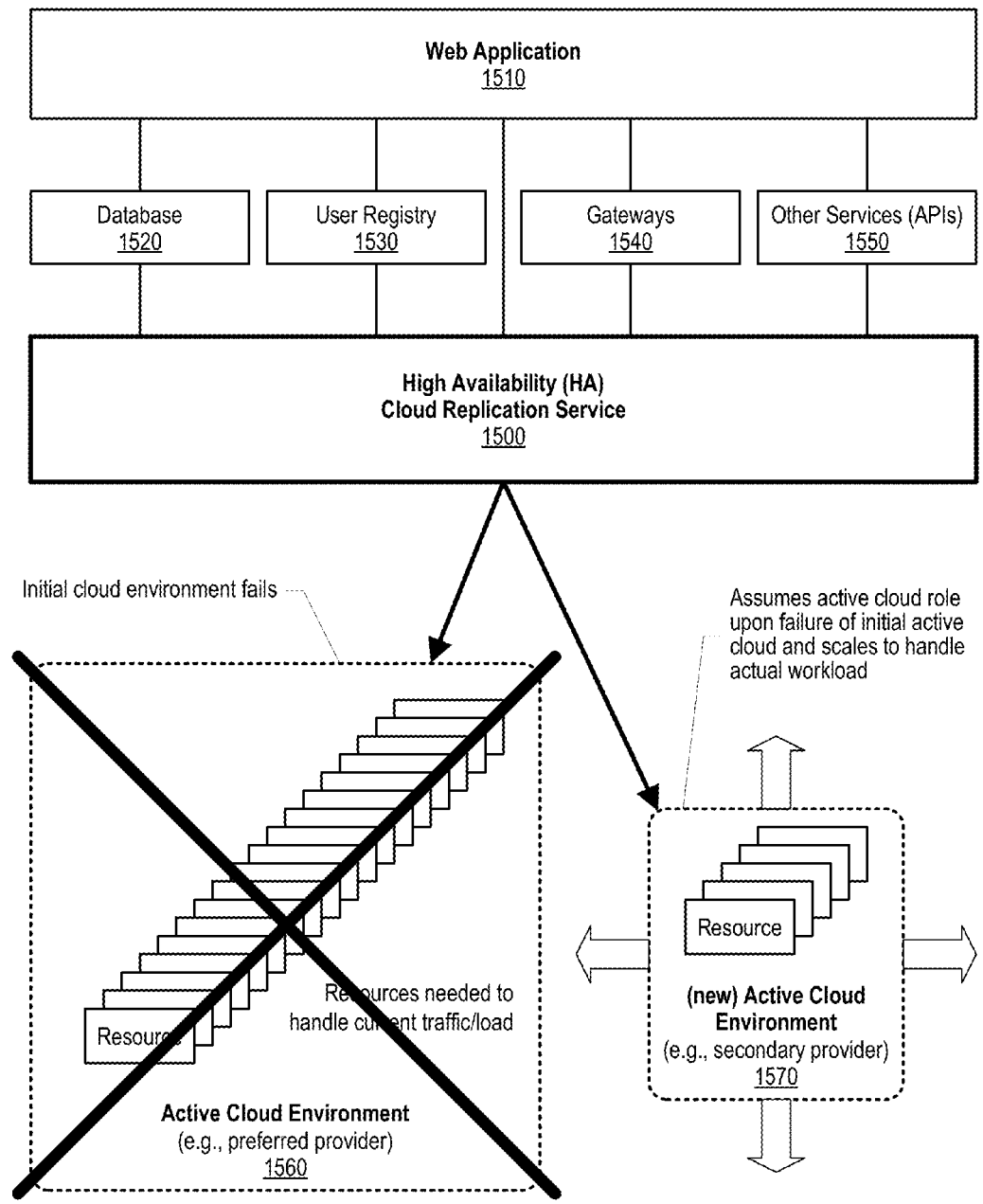
FIG. 16 is a depiction of the components from FIG. 15 after a failure occurs in the initial active cloud environment.

In the scenario shown in FIG. 16, Active Cloud Environment 1560 fails which causes the Passive Cloud Environment to assume the active role and commence handling the workload previously handled by the Active Cloud Environment. As explained in further detail in FIGS. 17-19, the commands used to provide resources to Active Cloud Environment were intercepted and stored in a queue. The queue of commands is then used to scale the Passive Cloud Environment appropriately so that it can adequately handle the workload that was previously handled by the Active Cloud Environment.

Figure 17:
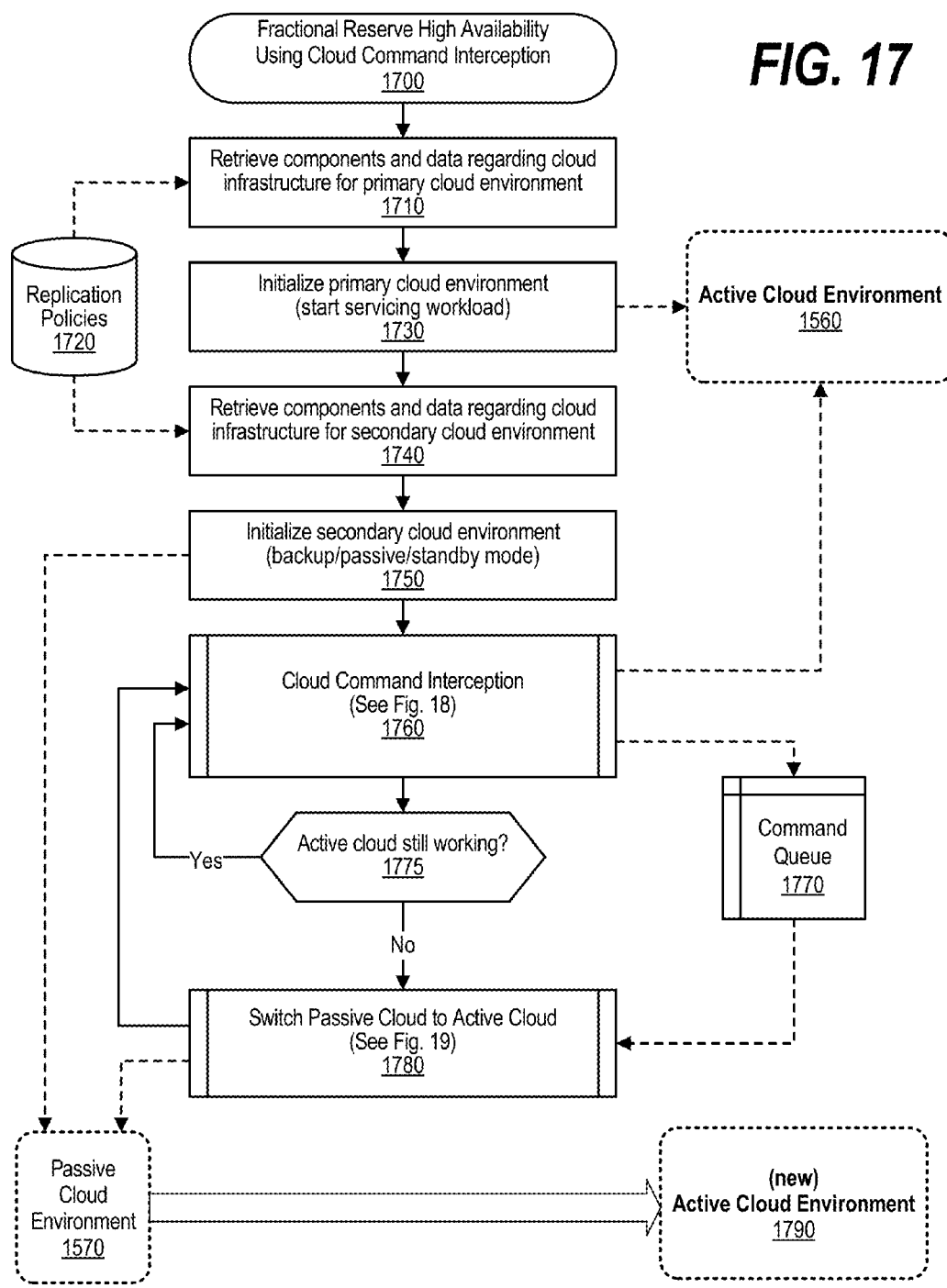
FIG. 17 is a depiction of a flowchart showing the logic used to implement fractional reserve High Availability (HA) cloud by using cloud command interception.

FIG. 17 is a depiction of a flowchart showing the logic used to implement fractional reserve High Availability (HA) cloud by using cloud command interception. Process commences at 1700 whereupon, at step 1710, the process retrieves components and data regarding cloud infrastructure for the primary (active) cloud environment. The list of components and data is retrieved from data store 1720 that is used to store the replication policies associated with one or more workloads.

At step 1730, the process initializes the primary (active) cloud environment 1560 and starts servicing the workload. At step 1740, the process retrieve components and data regarding the cloud infrastructure for the secondary (passive) cloud environment which has fewer resources than the active cloud environment. At step 1750, the process initialize the secondary (passive) cloud environment which assumes a backup/passive/standby role in comparison to the active cloud environment and, as previously mentioned, uses fewer resources than are used by the active cloud environment.

Figure 18:
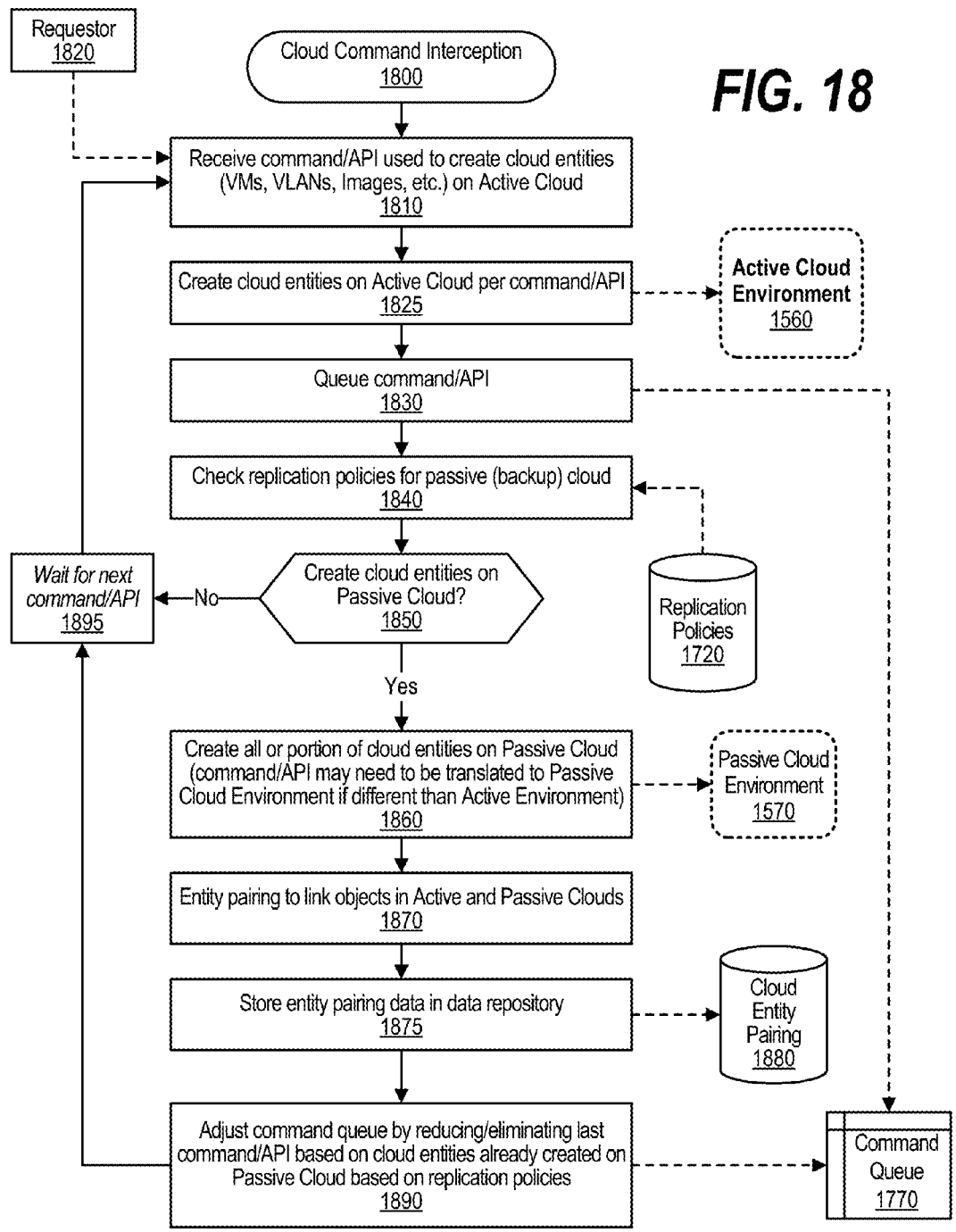
FIG. 18 is a depiction of a flowchart showing the logic used in cloud command interception.

After both the active cloud and the passive cloud environments have been initialized, at predefined process 1760, the process performs cloud command interception (see FIG. 18 and corresponding text for processing details). The cloud command interception stores intercepted commands in command queue 1770.

A decision is made by the process as to whether the active cloud environment is still operating (decision 1775). If the active cloud environment is still operating, then decision 1775 branches to the "yes" branch which loops back to continue intercepting cloud commands as detailed in FIG. 18. This looping continues until such point as the active cloud environment is no longer operating, at which point decision 1775 branches to the "no" branch.

Figure 19:
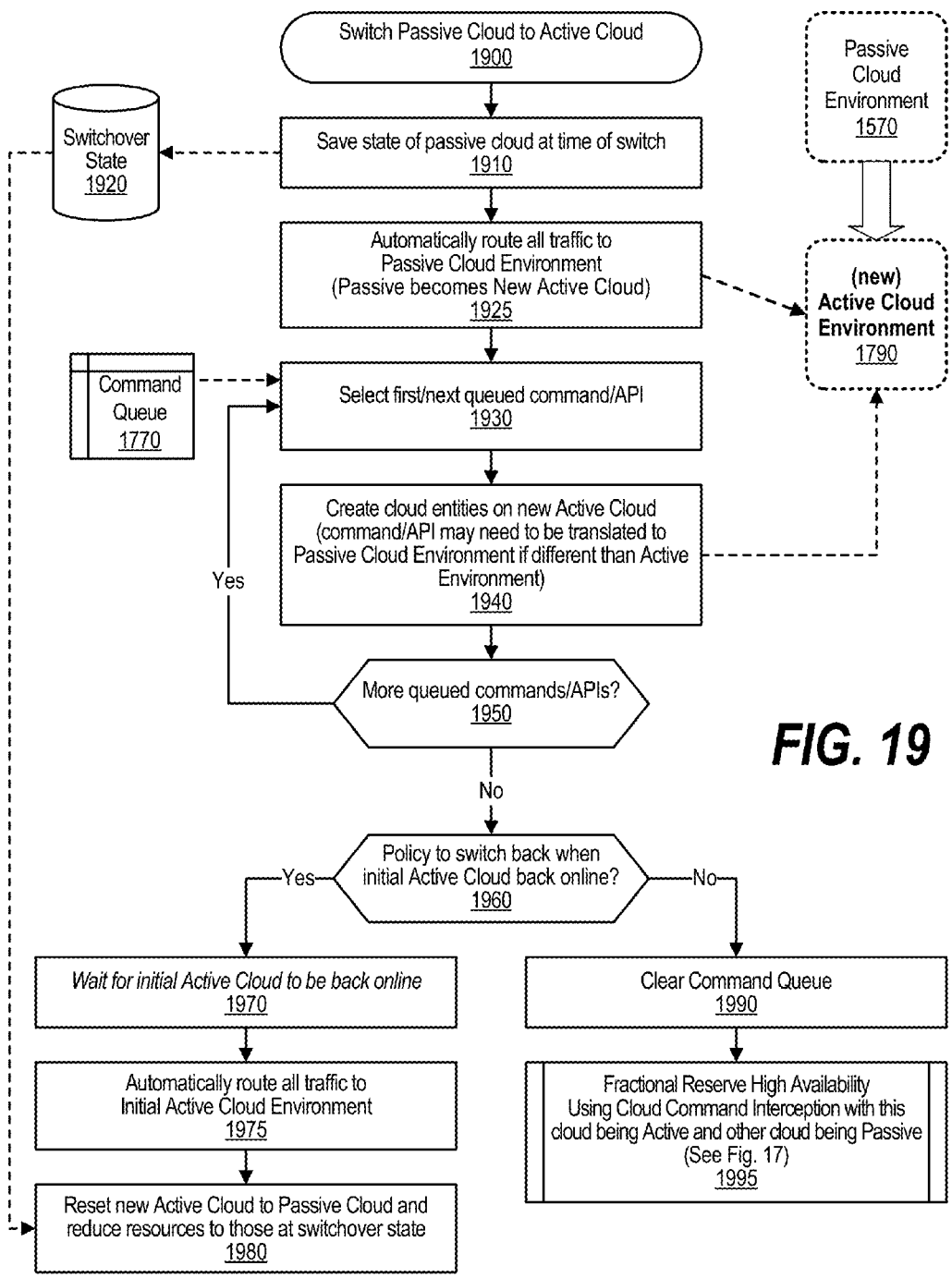
FIG. 19 is a depiction of a flowchart showing the logic used to switch the passive cloud to the active cloud environment.

When the active cloud environment is no longer in operation, at predefined process 1780, the process switches the passive cloud environment to be the active cloud environment, utilizing the intercepted cloud commands that were stored in queue 1770 (see FIG. 19 and corresponding text for processing details). As shown, this causes Passive Cloud Environment 1570 to scale appropriately and become new Active Cloud Environment 1790.

FIG. 18 is a depiction of a flowchart showing the logic used in cloud command interception. Process commences at 1800 whereupon, at step 1810, the process receive (intercepts) commands and APIs used to create cloud entities (VMs, VLANs, Images, etc.) on Active Cloud Environment 1560. The commands and APIs are received from Requestor 1820, such as a system administrator.

At step 1825, the process creates cloud entities on Active Cloud Environment in accordance with the received command or API (e.g., allocating additional VMs, computing resources, etc. to the Active Cloud Environment, etc.). At step 1830, the process queues the command or API in command queue 1770. At step 1840, the process check the replication policies for passive (backup) cloud environment by retrieving the policies from data store 1720. For example, rather than leaving the passive cloud environment at a minimal configuration, the policy might be to grow (scale) the passive cloud environment at a slower pace than the active cloud environment. So, when five VMs are allocated to the active cloud environment, the policy might be to allocate an additional VM to the passive cloud environment.

A decision is made by the process as to whether the policy is to create any additional cloud entities in the passive cloud environment (decision 1850). If the policy is to create cloud entities in the passive cloud environment, then decision 1850 branches to the "yes" branch to create such entities.

At step 1860, the process create all or portion of cloud entities on Passive Cloud as per the command or API. Note that the command/API may need to be translated to Passive Cloud Environment if the commands/APIs are different than those used in the Active Cloud Environment. This results in an adjustment (scale change) to Passive Cloud Environment 1570. At step 1870, the process performs entity pairing to link objects in the Active and the Passive Clouds. At step 1875, the process store the entity pairing data in data repository 1880. At step 1890 the process adjusts the commands/APIs stored in command queue 1770 by reducing/eliminating the last command or API based on the cloud entities that have already been created in the Passive Cloud Environment (step 1860) based on the replication policies. Returning to decision 1850, if the policy is not to create cloud entities in the passive cloud environment based on this command/API, then decision 1850 branches to the "no" branch bypassing steps 1860 through 1890.

At step 1895, the process waits for the next command or API to be received that is directed to the Active Cloud Environment, at which point process loops back to step 1810 to process the received command or API as described above.

FIG. 19 is a depiction of a flowchart showing the logic used to switch the passive cloud to the active cloud environment. Processing commences at 1900 when the Active Cloud Environment has failed. At step 1910, the process saves the current state (scale) of passive cloud environment 1570 at the time of the switch. The current state of the passive cloud environment is stored in data store 1920.

At step 1925, the process automatically routes all traffic to the Passive Cloud Environment with the Passive Cloud Environment 1570 becoming New Active Cloud Environment 1790. Next, the command queue is processed to scale the new Active Cloud Environment in accordance with the scaling performed for the previous Active Cloud Environment.

At step 1930, the process selects the first queued command or API from command queue 1770. At step 1940, the process creates cloud entities on new Active Cloud Environment 1790 in accordance with the selected command or API. Note that the command/API may need to be translated to Passive Cloud Environment if the commands/APIs are different than those used in the Active Cloud Environment. A decision is made by the process as to whether there are more queued commands or APIs to process (decision 1950). If there are more queued commands or APIs to process, then decision 1950 branches to the "yes" branch which loops back to step 1930 to select and process the next queued command/API as described above. This looping continues until all of the commands/APIs from command queue 1770 have been processed, at which point decision 1950 branches to the "no" branch for further processing.

A decision is made by the process as to whether there is a policy to switch back to the original Active Cloud Environment when it is back online (decision 1960). If there is a policy to switch back to the original Active Cloud Environment when it is back online, then decision 1960 branches to the "yes" branch whereupon, at step 1970, the process waits for the original Active Cloud Environment to be back online and operational. When the original Active Cloud Environment is back online and operational, then, at step 1975, the process automatically routes all traffic back to the Initial Active Cloud Environment and, at step 1980, the new Active Cloud Environment is reset back to the Passive Cloud Environment and the Passive Cloud Environment is scaled back to the scale of the Passive Cloud Environment when the switchover occurred with such state information being retrieved from data store 1920.

Returning to decision 1960, if there is no policy to switch back to the original Active Cloud Environment when it is back online, then decision 1960 branches to the "no" branch whereupon, at step 1990, command queue 1770 is cleared so that it can be used to store commands/APIs used to create entities in the new Active Cloud Environment. At step predefined process 1995, the process performs the Fractional Reserve High Availability Using Cloud Command Interception routine with this cloud being the (new) Active Cloud Environment and other cloud (the initial Active Cloud Environment) now assuming the role as the Passive Cloud Environment (see FIG. 17 and corresponding text for processing details).

Figure 20:
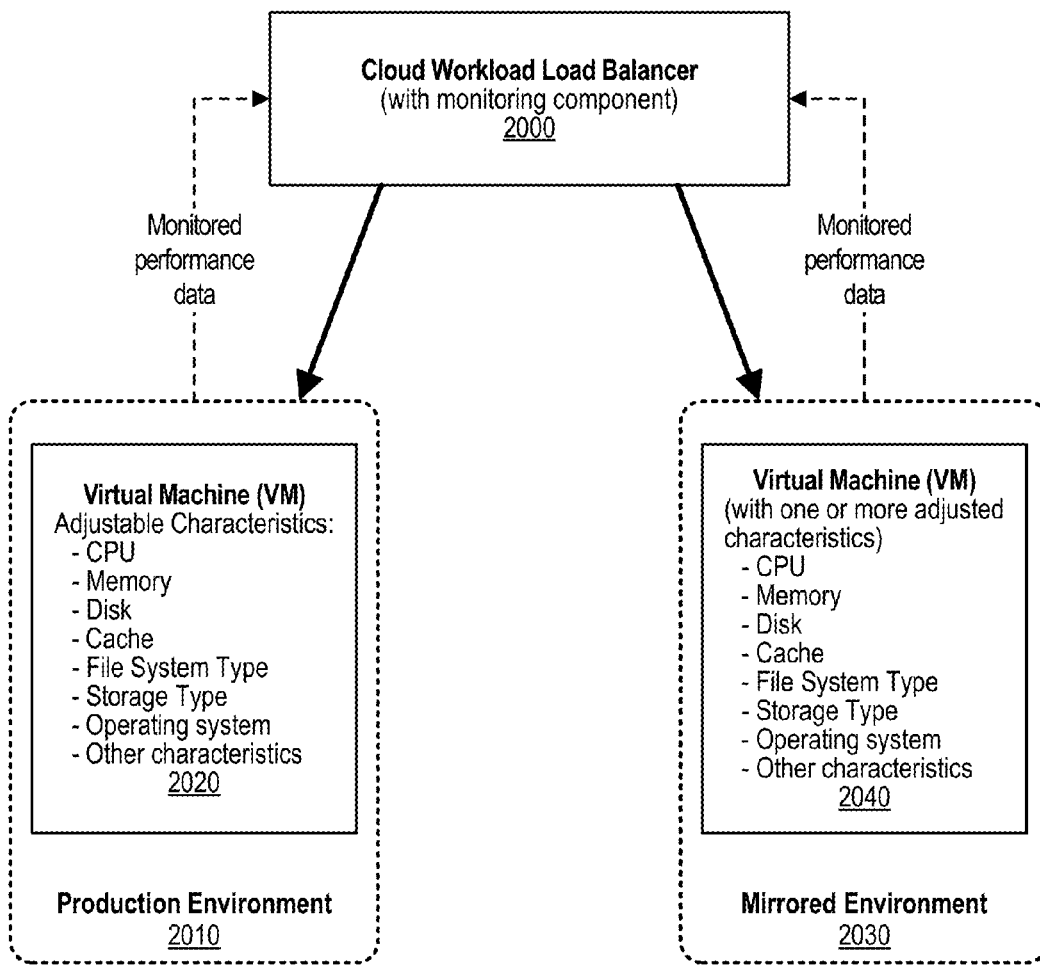
FIG. 20 is a component diagram showing the components used in determining a horizontal scaling pattern for a cloud workload.

FIG. 20 is a component diagram showing the components used in determining a horizontal scaling pattern for a cloud workload. Cloud Workload Load Balancer 2000 includes a monitoring component to monitor performance of a workload running in production environment 2010 as well as in one or more mirrored environments. The production environment virtual machine (VM) has a number of adjustable characteristics including a CPU characteristic, a Memory characteristic, a Disk characteristic, a Cache characteristic, a File System Type characteristic, a Storage Type characteristic, an Operating system characteristic, and other characteristics. The mirrored environment includes the same characteristics with one or more being adjusted when compared to the production environment. The Cloud Workload Load Balancer monitors the performance data from both the production environment and the mirrored environment to optimize the adjustment of the VM characteristics used to run the workload.

Figure 21:
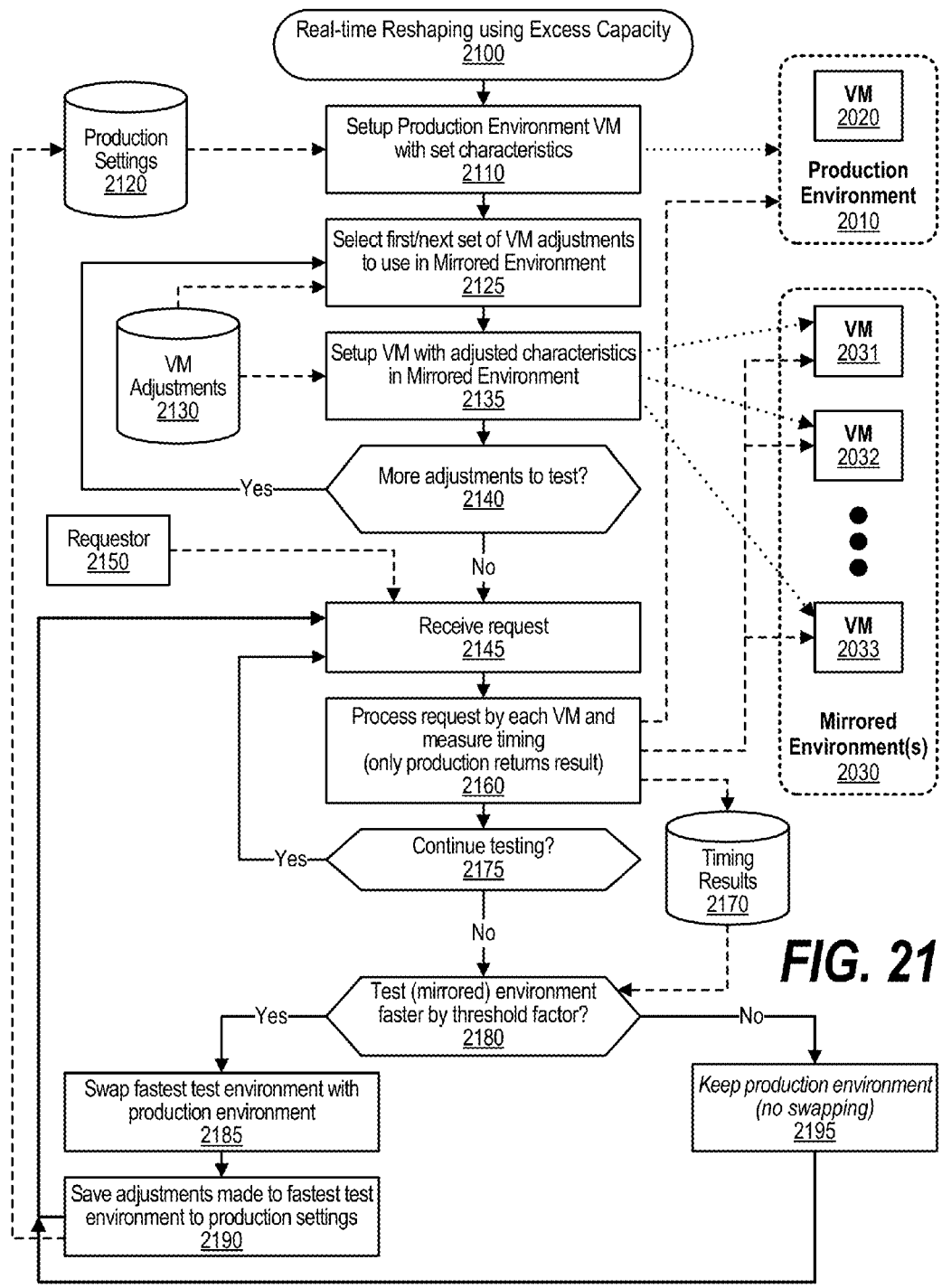
FIG. 21 is a depiction of a flowchart showing the logic used in real-time reshaping of virtual machine (VM) characteristics by using excess cloud capacity.

FIG. 21 is a depiction of a flowchart showing the logic used in real-time reshaping of virtual machine (VM) characteristics by using excess cloud capacity. Process commences at 2100 whereupon, at step 2110, the process sets up Production Environment VM 2010 using a set of production setting characteristics retrieved from data store 2120.

At step 2125, the process selects the first set of VM adjustments to use in Mirrored Environment 2030 with the VM adjustments being retrieved from data store 2130. A decision is made by the process as to whether there are more adjustments being tested by additional VMs running in the mirrored environment (decision 2140). As shown, multiple VMs can be instantiated with each of the VMs running using one or more VM adjustments so that each of the mirrored environment VMs (VMs 2031, 2032, and 2033) are running with a different configuration of characteristics. If there are more adjustments to test, then decision 2140 branches to the "yes" branch which loops back to select the next set of VM adjustments to use in the mirrored environment and sets up another VM based on the set of adjustments. This looping continues until there are no more adjustments to test, at which point decision 2140 branches to the "no" branch for further processing.

At step 2145, the process receives a request from requestor 2150. At step 2160, the request is processed by each VM (production VM and each of the mirrored environment VMs) and timing is measured as to how long each of the VMs took to process the request. Note however, that the process inhibits the return of results by all VMs except for the production VM. The timing results are stored in data store 2170. A decision is made by the process as to whether to continue testing (decision 2175). If further testing is desired, then decision 2175 branches to the "yes" branch which loops back to receive and process the next request and record the time taken by each of the VMs to process the request. This looping continues until no further testing is desired, at which point decision 2175 branches to the "no" branch for further processing.

A decision is made by the process as to whether one of the test VMs (VMs 2031, 2032, or 2033) running in mirrored environment 2030 performed faster than the production VM (decision 2180). In one embodiment, the test VM needs to be faster than the production VM by a given threshold factor (e.g., twenty percent faster, etc.). If one of the test VMs performed the requests faster than the production VM, then decision 2180 branches to the "yes" branch for further processing.

At step 2185, the process swaps the fastest test environment VM with the production environment VM so that the test VM is now operating as the production VM and returns results to the requestors. At step 2190, the process saves adjustments that were made to the fastest test environment VM to the production settings that are stored in data store 2120. On the other hand, if none of the test VMs performed faster than the production VM, then decision 2180 branches to the "no" branch whereupon, at step 2195, the process keeps the production environment VM as is with no swapping with any of the test VMs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of scaling a workload being executed in a cloud computing environment, the method comprising:
   providing incoming traffic of the workload concurrently to both a scaled up resource configuration and a scaled out resource configuration, wherein the scaled up resource configuration adds additional resources to a first virtual machine (VM) running the workload, and wherein the scaled out resource configuration adds one or more VMs to a second VM to create a first plurality of VMs running the workload;
   comparing a plurality of test results generated from the scaled up resource configuration and the scaled out resource configuration, the comparison resulting in an optimal resource configuration; and
   optimizing a workload scaling profile based upon the optimized resource configuration.

2. The method of claim 1 further comprising:
   creating a mirror image of the first VM to create the second VM, wherein the first and second VMs are both running in the cloud computing environment; and
   processing the incoming traffic by both the first VM and the first plurality of VMs to create a first set of test results corresponding to the scaled up resource configuration and a second set of test results corresponding to the scaled out resource configuration, wherein both the first and second sets of test results are included in the plurality of test results.

3. The method of claim 2 wherein at least one of the additional resources added to the first VM is selected from the group consisting of additional CPU resources, additional memory, additional IP addresses, and additional network bandwidth.

4. The method of claim 1 further comprising:
   prior to the inputting of the incoming traffic to both the scaled up resource configuration and the scaled out resource configuration, detecting that the workload is stressed by comparing one or more performance metrics to one or more thresholds; and
   performing the inputting, the comparing, and the optimizing in response to the workload not having the workload scaling profile prior to the detecting.

5. The method of claim 1 further comprising:
   prior to the inputting of the incoming traffic to both the scaled up resource configuration and the scaled out resource configuration, detecting that the workload is stressed by comparing one or more performance metrics to one or more thresholds; and
   in response to determining that the workload has an existing workload scaling profile, updating the existing workload scaling profile based upon the optimized resource configuration.

6. An information handling system comprising:
   one or more processors;
   a memory coupled to at least one of the processors; and
   a set of instructions stored in the memory and executed by at least one of the processors to scale a workload being executed in a cloud computing environment, wherein the set of instructions perform actions of:
      providing incoming traffic of the workload concurrently to both a scaled up resource configuration and a scaled out resource configuration, wherein the scaled up resource configuration adds additional resources to a first virtual machine (VM) running the workload, and wherein the scaled out resource configuration adds one or more VMs to a second VM to create a first plurality of VMs running the workload;
      comparing a plurality of test results generated from the scaled up resource configuration and the scaled out resource configuration, the comparison resulting in an optimal resource configuration; and
      optimizing a workload scaling profile based upon the optimized resource configuration.

7. The information handling system of claim 6 where the actions further comprise:
   creating a mirror image of the first VM to create the second VM, wherein the first and second VMs are both running in the cloud computing environment; and
   processing the incoming traffic by both the first VM and the first plurality of VMs to create a first set of test results corresponding to the scaled up resource configuration and a second set of test results corresponding to the scaled out resource configuration, wherein both the first and second sets of test results are included in the plurality of test results.

8. The information handling system of claim 7 wherein at least one of the additional resources added to the first VM is selected from the group consisting of additional CPU resources, additional memory, additional IP addresses, and additional network bandwidth.

9. The information handling system of claim 6 where the actions further comprise:
   prior to the inputting of the incoming traffic to both the scaled up resource configuration and the scaled out resource configuration, detecting that the workload is stressed by comparing one or more performance metrics to one or more thresholds; and performing the inputting, the comparing, and the optimizing in response to the workload not having the workload scaling profile prior to the detecting.

10. The information handling system of claim 6 where the actions further comprise:
   prior to the inputting of the incoming traffic to both the scaled up resource configuration and the scaled out resource configuration, detecting that the workload is stressed by comparing one or more performance metrics to one or more thresholds; and
   in response to determining that the workload has an existing workload scaling profile, updating the existing workload scaling profile based upon the optimized resource configuration.

11. A computer program product stored in a non-transitory computer readable medium, comprising computer instructions that, when executed by an information handling system, causes the information handling system to scale a workload being executed in a cloud computing environment by performing actions comprising:
   providing incoming traffic of the workload concurrently to both a scaled up resource configuration and a scaled out resource configuration, wherein the scaled up resource configuration adds additional resources to a first virtual machine (VM) running the workload, and wherein the scaled out resource configuration adds one or more VMs to a second VM to create a first plurality of VMs running the workload;
   comparing a plurality of test results generated from the scaled up resource configuration and the scaled out resource configuration, the comparison resulting in an optimal resource configuration; and
   optimizing a workload scaling profile based upon the optimized resource configuration.

12. The computer program product of claim 11 where the actions further comprise:
   creating a mirror image of the first VM to create the second VM, wherein the first and second VMs are both running in the cloud computing environment; and
   processing the incoming traffic by both the first VM and the first plurality of VMs to create a first set of test results corresponding to the scaled up resource configuration and a second set of test results corresponding to the scaled out resource configuration, wherein both the first and second sets of test results are included in the plurality of test results.

13. The computer program product of claim 12 wherein at least one of the additional resources added to the first VM is selected from the group consisting of additional CPU resources, additional memory, additional IP addresses, and additional network bandwidth.

14. The computer program product of claim 11 where the actions further comprise:
   prior to the inputting of the incoming traffic to both the scaled up resource configuration and the scaled out resource configuration, detecting that the workload is stressed by comparing one or more performance metrics to one or more thresholds; and
   performing the inputting, the comparing, and the optimizing in response to the workload not having the workload scaling profile prior to the detecting.

15. The computer program product of claim 11 where the actions further comprise:
   prior to the inputting of the incoming traffic to both the scaled up resource configuration and the scaled out resource configuration, detecting that the workload is stressed by comparing one or more performance metrics to one or more thresholds; and
   in response to determining that the workload has an existing workload scaling profile, updating the existing workload scaling profile based upon the optimized resource configuration.

* * * * *